(12) United States Patent
Yomogita

(10) Patent No.: US 7,743,356 B2
(45) Date of Patent: Jun. 22, 2010

(54) METHOD OF DISPOSING DUMMY PATTERN

(75) Inventor: Koji Yomogita, Tokyo (JP)

(73) Assignee: Oki Semiconductor Co., Ltd., Tokyo (JP)

( * ) Notice: Subject to any disclaimer, the term of this patent is extended or adjusted under 35 U.S.C. 154(b) by 802 days.

(21) Appl. No.: 11/306,392

(22) Filed: Dec. 27, 2005

(65) Prior Publication Data

US 2006/0199284 A1    Sep. 7, 2006

(30) Foreign Application Priority Data

Jan. 17, 2005    (JP)    ............................. 2005-009626

(51) Int. Cl.
*G06F 17/50*    (2006.01)

(52) U.S. Cl. ....................................................... 716/10

(58) Field of Classification Search ................ 716/1–18
See application file for complete search history.

(56) References Cited

U.S. PATENT DOCUMENTS

| | | | |
|---|---|---|---|
| 2002/0116696 A1* | 8/2002 | Suaya et al. ................... | 716/6 |
| 2003/0145296 A1* | 7/2003 | Chandra et al. ................ | 716/6 |
| 2003/0229875 A1* | 12/2003 | Smith et al. ................... | 716/10 |
| 2004/0034838 A1* | 2/2004 | Liau .............................. | 716/4 |

FOREIGN PATENT DOCUMENTS

| | | |
|---|---|---|
| JP | 10/178013 A | 6/1998 |
| JP | 10/335326 A | 12/1998 |
| JP | 2000/277615 A | 10/2000 |
| JP | 2001/203272 A | 7/2001 |

OTHER PUBLICATIONS

Sylvester et al., "Investigation of Interconnect Capacitance Characterization Using Charge-Based Capacitance Measurement (CBCM) Technique and Three-Dimensional Simulation", IEEE Journal of Solid-State Circuits, vol. 33, No. 3, 1998, pp. 449-453.*

Elgamel et al., "Interconnect Noise Analysis and Optimization in Deep Submicron Technology", IEEE Circuits and Systems Magazine, vol. 3, No. 4, 2003, pp. 6-17.*

* cited by examiner

*Primary Examiner*—Jack Chiang
*Assistant Examiner*—Aric Lin
(74) *Attorney, Agent, or Firm*—Rabin & Berdo, P.C.

(57) ABSTRACT

A method of disposing a dummy pattern includes the steps of obtaining an inter-wiring parasitic capacity and a wiring total parasitic capacity for each wiring using wiring layout data and initial dummy pattern layout data; creating a first data base based on the inter-wiring parasitic capacity; creating a second data base based on the wiring total parasitic capacity; performing dynamic and static simulations for creating a third data base storing the results of the dynamic and static simulations, the result of the dynamic simulation being information about the first wiring, and the result of the static simulation being information about the second wiring; and performing an additional insertion of dummy pattern near a third wiring, the third wiring being determined to be a wiring which is capable of be affected by voltage noise based on the data in the third data base.

36 Claims, 17 Drawing Sheets

Fig. 9

|  | WITH DUMMY PATTERN | WITHOUT DUMMY PATTERN |
|---|---|---|
| A-B INTER-WIRING TOTAL PARASITIC CAPACITANCE $C_{AB}$ [F] | 1.57E-17 | 1.53E-17 |
| A-C INTER-WIRING TOTAL PARASITIC CAPACITANCE $C_{AC}$ [F] | 7.15E-17 | 1.29E-17 |
| TOTAL PARASITIC CAPACITANCE $C_{TOTAL}$ [F] (INCLUDING SUBSTRATE CAPACITY $C_S$) $C_{TOTAL} = C_{AB} + C_{AC} + C_S$ | 1.16E-16 | 5.49E-17 |
| AMOUNT OF VOLTAGE NOISE $V_n$ [V] THAT WIRING (A) RECEIVES | 0.13 | 0.28 |

Fig. 12
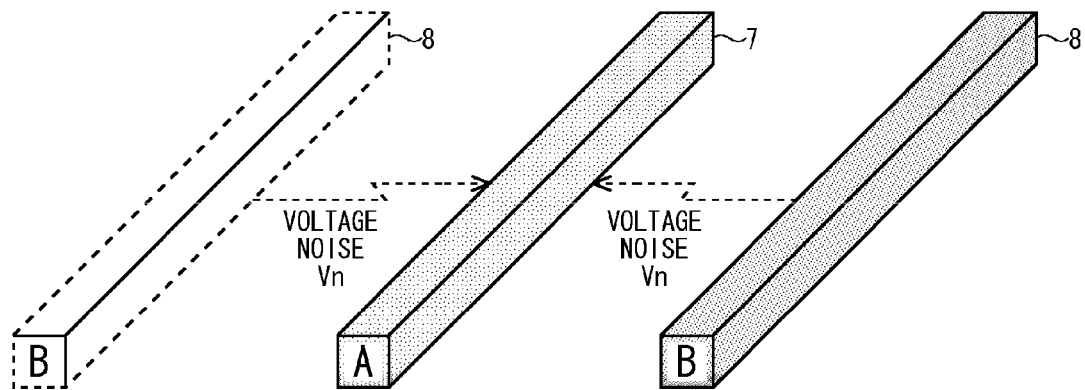
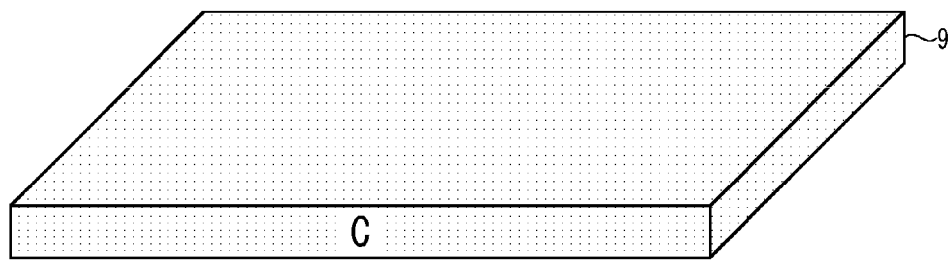

METHOD OF DISPOSING DUMMY PATTERN

BACKGROUND OF THE INVENTION

1. Field of the Invention

The present invention relates to a method of disposing a dummy pattern in a wiring process of a semiconductor integrated circuit having a multilevel wiring structure, the dummy patterns being used to planarize the surface of a layer and the reduction of voltage noise among wires.

2. Background Information

In recent years, in order to increase the density and integration of a semiconductor integrated circuit, a multilevel wiring structure has been adopted. In this multilevel wiring structure, wirings are arranged in a plurality of layers in a thickness direction of the semiconductor integrated circuit. In such multilevel wiring structure, in order to prevent problems in the wirings, such as the breaking of wires, caused by concavity and convexity in each layer, the layers need to be made highly planar. The most widely used method of planarizing a surface of an interlayer insulation film formed on the wiring is a method using a CMP (chemical mechanical polishing) method. However, with respect to this CMP method, if there is any deviation in the density of a wiring arrangement that is the foundation of the interlayer insulation film, i.e. if there are dense and non-dense portions in the wiring pattern, there is a possibility that some concavity and convexity will still remain on the surface of the interlayer insulation film even after the polishing, meaning that the surface of the interlayer insulation film will not be made completely planar. In order to resolve this problem, a dummy pattern, i.e. an electrically floating metal piece, is arranged in the non-dense portion of the wiring, and therefore the density of the wiring is made uniform.

For example, Japanese Laid Open Patent Application No. H10-335326 (hereinafter to be referred to as Patent Reference 1), Japanese Patent Application Laid Open No. H10-178013 (hereinafter to be referred to as Patent Reference 2), Japanese Laid Open Patent Application No. 2000-277615 (hereinafter to be referred to as Patent Reference 3) and Japanese Laid Open Patent Application No. 2001-20327 (hereinafter to be referred to as Patent Reference 4) disclose inventions relating to a dummy pattern disposal.

According to the invention disclosed in Patent Reference 1, a linear dummy pattern is placed between two adjacent wirings and in parallel with the wirings.

According to the invention disclosed in Patent Reference 2, a dummy pattern separated from the wirings by a predetermined distance is disposed so that a pattern density is made uniform by a pattern forming method including: a) a process of enlarging a wiring pattern by a predetermined measurement in terms of two dimension; b) a process of generating a reversal pattern by reversing the enlarged wiring pattern; c) a process of superimposing a superimposing pattern and the reversal pattern and leaving only the region which is redundant between the two patterns as a dummy metal pattern, the superimposing pattern having a plurality of same geometrical forms being arranged systematically at predetermined intervals.

According to the invention disclosed in Patent Reference 3, a region where the wirings are formed is divided into a number of blocks, among which base dummy metal patterns with low metal density are formed in the blocks in the vicinity of the metal wiring and base dummy metal patterns with high metal density are formed in the blocks which are apart from the metal wiring.

According to the invention disclosed in Patent Reference 4, a dummy pattern for adjusting the area ratio of a chip layout is formed on each layer while one dummy pattern has the same shape as of the dummy patterns in other layers and overlaps the other dummy patterns formed in other layers. Furthermore, by having the dummy pattern in each layer connected to either the power supply wiring (hereinafter to be referred to as a VDD wiring) or the ground wiring (hereinafter to be referred to as a GND wiring), a power source capacitance for decreasing radiant noise caused by an instantaneous current of the semiconductor integrated circuit is configured.

In order to make the wiring density uniform, it is desirable that the dummy patterns are disposed as evenly as possible in the free spaces among the wires. However, disposing the dummy patterns without any restriction might result in causing unnecessary capacitive connections among different wirings, which can induce problems such as changing the circuit characteristics, increasing the parasitic capacitance to cause signal delay, etc. Therefore, in disposing the dummy patterns, it is necessary to give consideration to the influences of possible changes in the parasitic capacitance and voltage noise which are accompanied by the dummy pattern disposal, in addition to making the pattern density uniform.

In accordance with the inventions of Patent References 1 to 3, a possible increase in the parasitic capacitance accompanied by the dummy pattern disposal is controlled by adjusting the disposing intervals or the pattern, etc. of the dummy patterns, but no direct consideration is given to the influences of possible voltage noise generated among wires in disposing the dummy pattern. Accordingly, with respect to these prior art inventions, there is a possibility that those wires which are normally not affected by the voltage noise might be affected by the voltage noise due to disposing the dummy patterns.

According to the invention disclosed in Patent Reference 4, the power source capacitance is configured in order to decrease the radiant noise caused by the instantaneous current of the semiconductor integrated circuit. The invention does not give consideration to disposing the dummy patterns considering the influences of possible voltage noise generated among wires in disposing the dummy pattern.

In view of the above, it will be apparent to those skilled in the art from this disclosure that there exists a need for an improved method of disposing dummy pattern in a semiconductor integrated circuit. This invention addresses this need in the art as well as other needs, which will become apparent to those skilled in the art from this disclosure.

SUMMARY OF THE INVENTION

It is therefore an object of the present invention to resolve the above-described problems, and to provide an improved method of disposing dummy pattern in a semiconductor integrated circuit.

In accordance with one aspect of the present invention, a method of disposing a dummy pattern, which is used for a semiconductor integrated circuit having a multilevel wiring structure, includes the steps of: obtaining a first inter-wiring parasitic capacitance and a first wiring total parasitic capacitance for each wiring using wiring layout data of the semiconductor integrated circuit and initial dummy pattern layout data; creating a first inter-wiring parasitic capacitance data base based on the first inter-wiring parasitic capacitance; creating a first wiring total parasitic capacitance data base based on the first wiring total parasitic capacitance; performing a first dynamic simulation for identifying a first wiring which should be affected by a voltage noise using the first inter-wiring parasitic capacitance data base and a first wiring total parasitic capacitance data base; performing a first static simulation for identifying a second wiring which should be affected by a voltage noise using the first inter-wiring parasitic capacitance data base and the first wiring total parasitic capacitance data base; creating a first wiring information data base storing the results of the first dynamic simulation and the first static simulation, the result of the first dynamic simulation being information about the first wiring, and the result of the first static simulation being information about the second wiring; and performing an additional insertion of dummy pattern near a third wiring in the initial dummy pattern, the third wiring being determined as a wiring which should be affected by a voltage noise based on the first wiring information data base.

In accordance with another aspect of the present invention, a method of disposing a dummy pattern, which is used for a semiconductor integrated circuit having a multilevel wiring structure in which a power supply wiring layer and a signal wiring layer are sequentially laminated, includes the step of: disposing a dummy pattern on a region of the signal wiring layer that is adjacent to the power supply wiring layer, the power supply wiring layer including a first power supply wiring layer having a first power supply wiring extending toward a first direction, and a second power supply wiring layer having a second power supply wiring extending toward a second direction which is perpendicular with the first direction, the region corresponding to the crossover point where the first power supply wiring and the second power supply wiring cross over each other.

These and other objects, features, aspects, and advantages of the present invention will become apparent to those skilled in the art from the following detailed description, which, taken in conjunction with the annexed drawings, discloses preferred embodiments of the present invention.

BRIEF DESCRIPTION OF THE DRAWINGS

Referring now to the attached drawings which form a part of this original disclosure:

FIG. 9 is a table for showing a result of a simulation according to the first embodiment of the present invention;

FIG. 12 is a diagram for explaining a physical relationship between a wiring which could be affected by a voltage noise, a wiring which imparts voltage noise and a wiring which is capable of receiving a voltage noise in the second embodiment of the present invention;

DETAILED DESCRIPTION OF THE PREFERRED EMBODIMENTS

Figure 1:
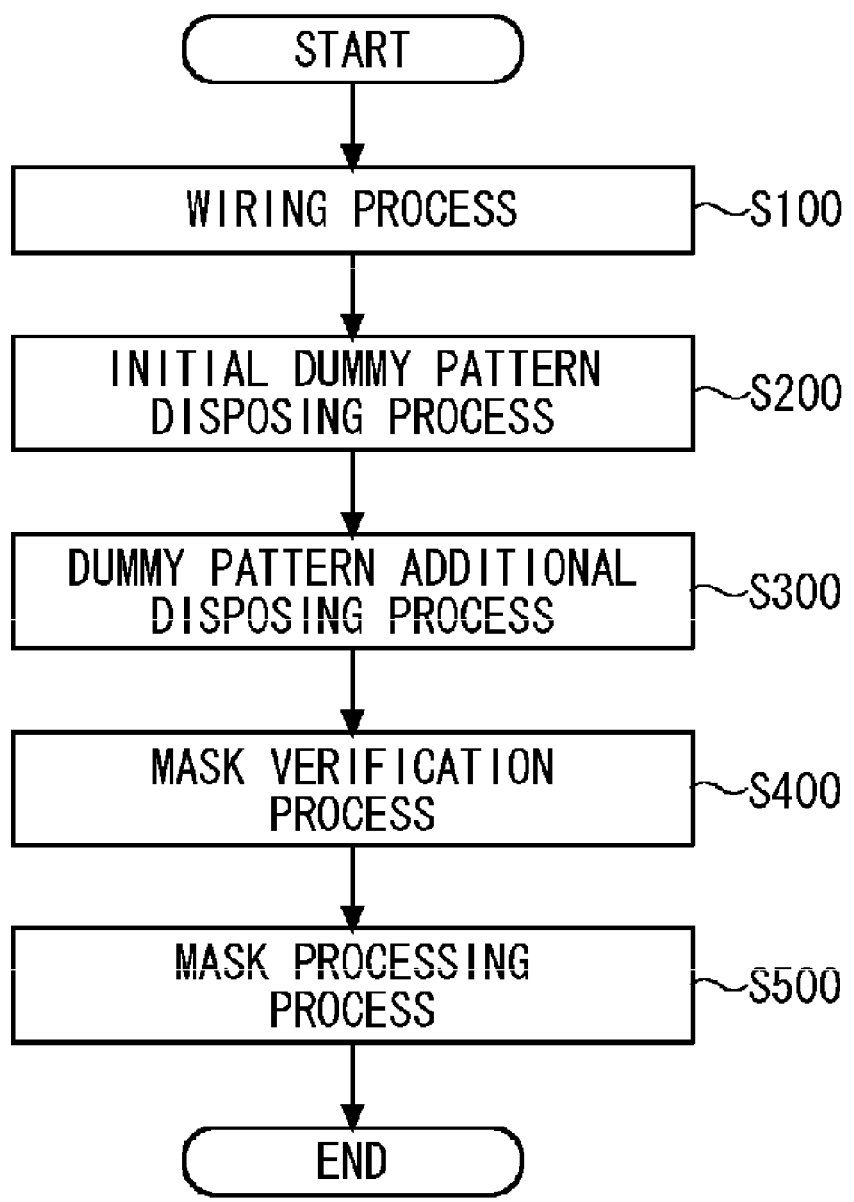
FIG. 1 is a flow chart showing an example of a layout process of a semiconductor integrated circuit using a dummy pattern disposing method according to first and second embodiments of the present invention.

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

Referring now to the drawings, preferred embodiments of the present invention will be described in detail.

First Embodiment

FIG. 1 is a flow chart showing an example of a layout process of a semiconductor integrated circuit using a dummy pattern disposing method according to a first embodiment of the present invention. The layout process of FIG. 1 includes a wiring process S100, an initial dummy pattern disposing process S200, a dummy pattern additional disposing process S300, a mask verification process S400 and a mask processing process S500. The dummy pattern disposing method of the present invention is executed at the additional dummy pattern disposing process S300, and it will be described in more detail below.

In the wiring process S100, various functional blocks that are the constituents of the semiconductor integrated circuit are disposed at predetermined positions and are mutually connected to each other by wiring layers. In addition, in the wiring process S100, capacitance extraction is performed with respect to each wire, and using the result of the capacitance extraction, a post layout simulation, i.e. dynamic simulation, static simulation etc., is performed. In the initial dummy pattern disposing process S200, dummy metal patterns are arranged in free spaces of the wiring layout for the purpose of adjusting the wiring pattern density. The arrangement of dummy metal patterns can be done by performing logic operations as are done in the conventional method. For instance, first, one can enlarge the wiring pattern of the semiconductor integrated circuit by a predetermined measurement, then calculate a reversal region which is formed by a region excluding the enlarged wiring pattern, and perform logic operation processing such that the dummy metal patterns are arranged in the reversal region. This arrangement of dummy metal patterns can also be done manually. The mask verification process S400 and the mask processing process S500 are done in the same way as in the conventional method; and since they do not directly relate to the invention itself, explanations thereof will be omitted here.

Figure 2:
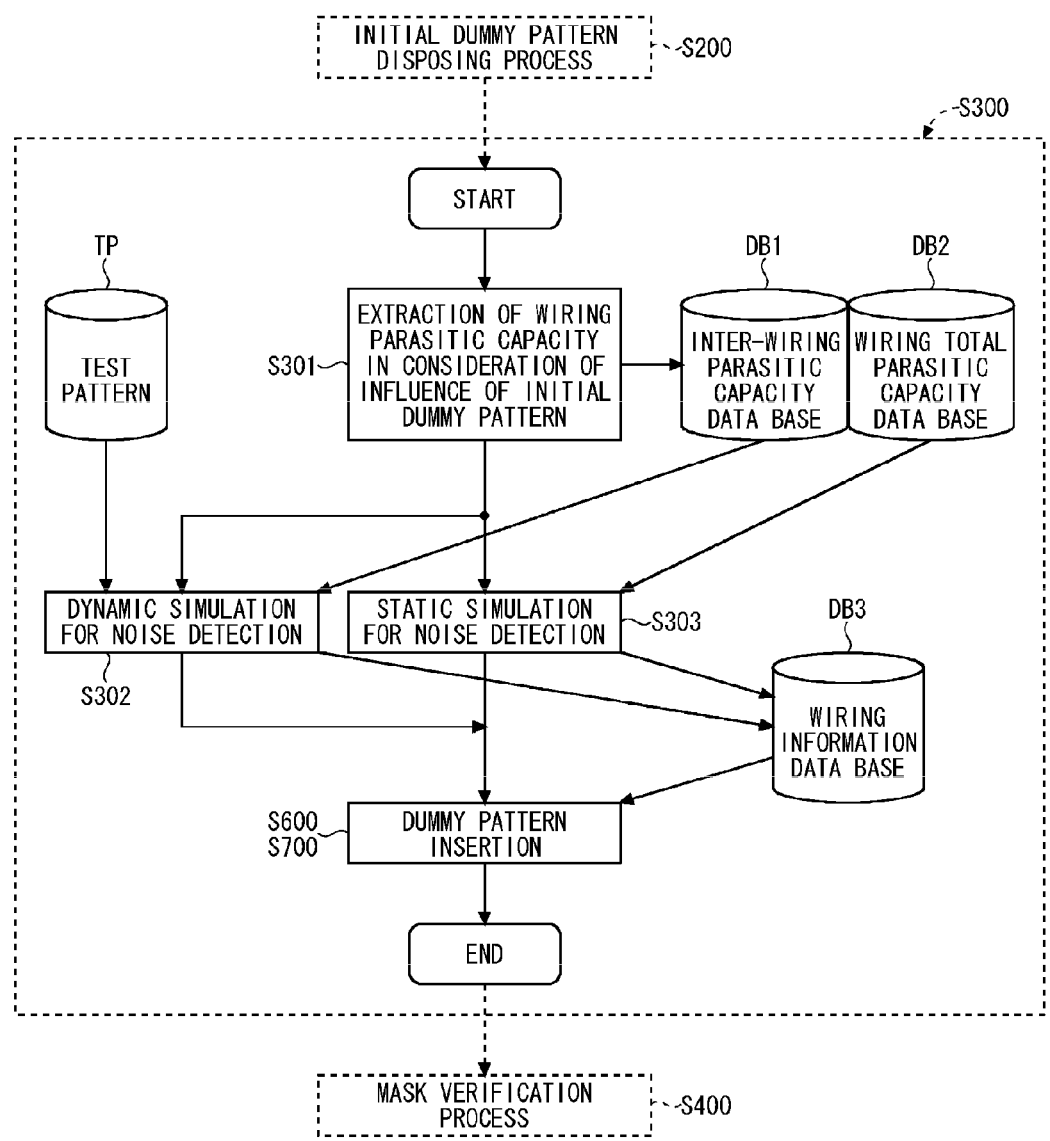
FIG. 2 is a flow chart showing a detailed process flow of a dummy pattern additional disposing process in the first and second embodiments of the present invention.

Next, the additional dummy pattern disposing process S300, in which the dummy pattern disposing method of the present invention is implemented, will be explained. FIG. 2 is a flow chart showing a process flow of the additional dummy pattern disposing process S300.

In step S301, layout data, i.e. wiring pattern data and initial dummy metal pattern data, generated in the wiring process S100 and the initial dummy pattern disposing process S200 is used to extract a parasitic capacitance with respect to each wiring. The parasitic capacitance extracted here includes inter-wiring parasitic capacitances and a wiring total parasitic capacitance. The inter-wiring parasitic capacitance is a parasitic v generated between adjacent wirings, and the wiring total parasitic capacitance is derived by adding a substrate capacitance generated between the wiring and the semiconductor substrate to the inter-wiring parasitic capacitance. On the basis of the inter-wiring parasitic capacitances and the wiring total parasitic capacitance extracted in step S301, inter-wiring parasitic capacitance data base DB1 and wiring total parasitic capacitance data base DB2 are generated. These data bases store information, for instance, about a node name of the wiring, a parasitic capacitance with respect to that node and so forth.

Figure 3:
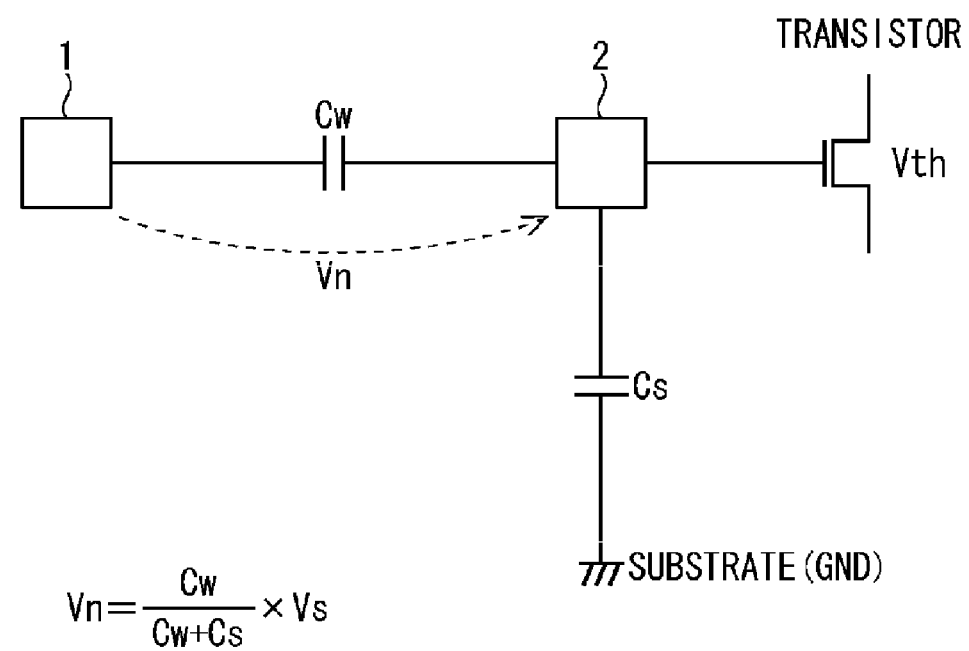
FIG. 3 is a simplified model diagram for explaining an influence of a voltage noise.

In step S302, a dynamic simulation for identifying the wirings which could be affected by voltage noise is performed using the inter-wiring parasitic capacitance data base DB1 (first inter-wiring parasitic capacitance data base) and the wiring total parasitic capacitance data base DB2 (first wiring total parasitic capacitance data base). In this dynamic simulation, several test patterns TP are used to virtually operate the circuit and calculate dynamically the amount of voltage noise that each wiring imparts to the adjacent wirings. Then those wirings that may malfunction due to such voltage noise, i.e. those wirings having a possibility of receiving voltage noise with a level surpassing a predetermined basis, are identified as the wirings which could be affected by voltage noise. Now, a specific method of identifying the wirings which could be affected by voltage noise will be described using a two dimensional simple model made up of wiring 1 and wiring 2 as shown in FIG. 3. In FIG. 3, provided that the inter-wiring parasitic capacitance between wiring 1 and wiring 2 is defined as Cw, the substrate capacitance between wiring 2 and the semiconductor substrate (GND) is defined as Cs, and the signal voltage passing through wiring 1 is defined as Vs, the amount of voltage noise Vn that wiring 1 can give to wiring 2 can be defined as $Vn=Vs \times Cw/(Cw+Cs)$. As to a judging standard whether wiring 2 may malfunction due to voltage noise, for instance, by assuming that the amount of voltage noise Vn surpasses the threshold voltage Vth of the transistor connected to the wiring 2, it will be possible to specifically identify the wiring which could be affected by voltage noise. The judging standard does not necessarily have to be based on the comparison between the amount of voltage noise Vn and the threshold voltage Vth of the transistor, and it is also possible to set different judging standard as appropriate. Furthermore, in identifying the wirings which could be affected by voltage noise, the amount of noise received from the adjacent wirings in the three dimensional direction, i.e. the vertical direction, is considered in addition to the amount of noise received from the wirings located in the same layer as shown in FIG. 3. Then on the basis of the results of the dynamic simulation and the static simulation, which will be described below, wiring information data base DB3 containing information about the wirings which may malfunction in response to voltage noise is produced. This wiring information data base DB3 stores a node name, amount of voltage noise, etc. of the wirings which may malfunction due to voltage noise.

In step S303, a static simulation for identifying the wirings which could be affected by voltage noise is performed using the inter-wiring parasitic capacitance data base DB1 and the wiring total parasitic capacitance data base DB2. In this static simulation, the amount of voltage noise that each wiring imparts to the adjacent wirings is calculated statically without using any test pattern. Then those wirings which may malfunction due to such voltage noise, i.e. those wirings having a possibility of receiving voltage noise with a level surpassing a predetermined basis, are identified as the wirings which could be affected by voltage noise. As to a specific method of identifying the wirings which could be affected by voltage noise, it is the same as the case of the dynamic simulation described with reference to FIG. 3. Then as mentioned before, on the basis of the results of the dynamic simulation and the static simulation, wiring information data base DB3 containing information about the wirings which may malfunction in response to voltage noise is produced. This wiring information data base DB3 stores a node name, amount of voltage noise, etc. of the wirings which could become malfunctional due to voltage noise.

In step S600, on the basis of the wiring information data base DB3 generated through the dynamic simulation and the static simulation, additional insertion of dummy patterns considering the influence of voltage noise is performed by a certain method which will be described below.

This is the overall flow of the additional dummy pattern disposing process S300.

Figure 4:
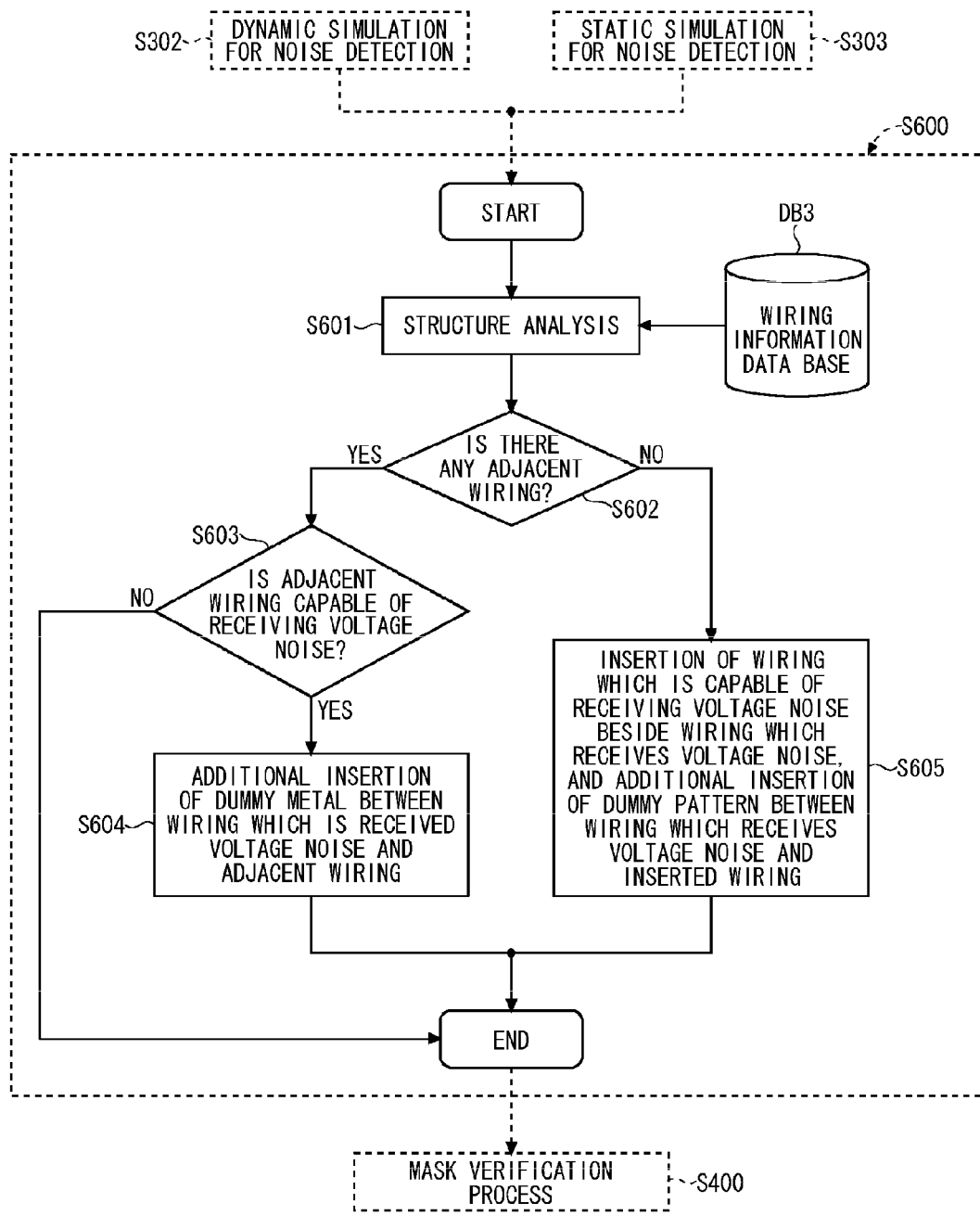
FIG. 4 is a flow chart showing a detailed process flow of a dummy pattern insertion process in the first embodiment of the present invention.

Next, details of a dummy pattern insertion process S600 will be described. FIG. 4 is a flow chart showing a process flow of the dummy pattern insertion process S600.

Figure 5:
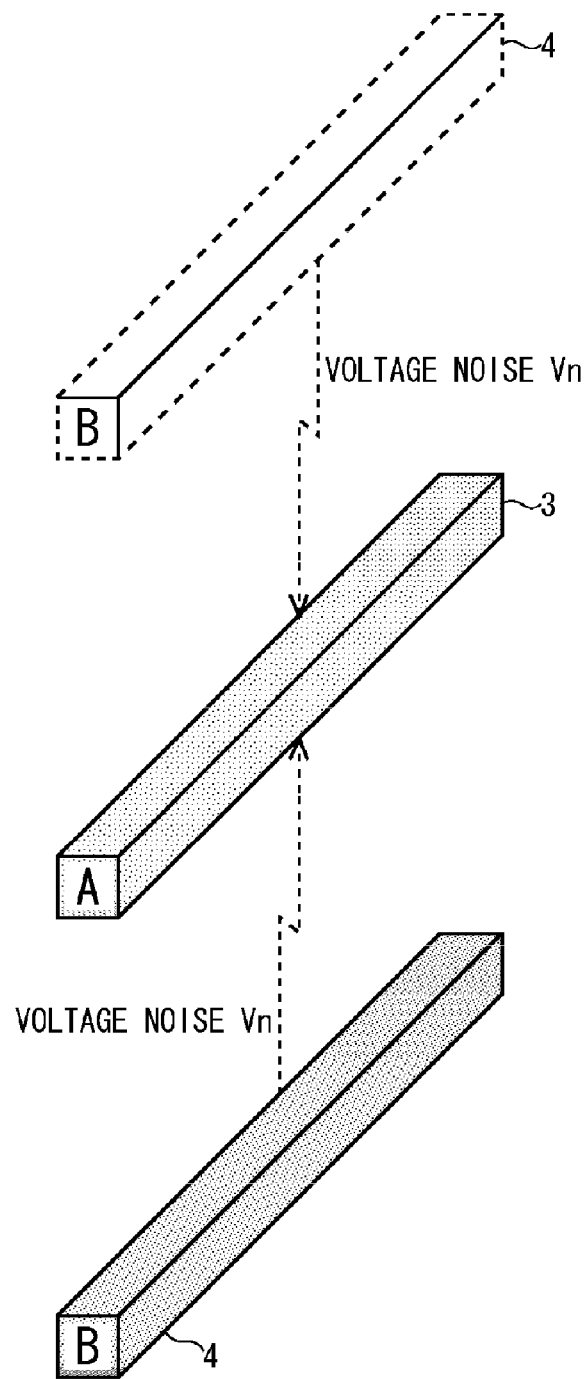
FIG. 5 is a diagram for explaining a physical relationship between a wiring which could be affected by a voltage noise and a wiring which imparts voltage noise in the first embodiment of the present invention.

In step S601, analysis of the wiring structure is done using the wiring information data base DB3. In the structure analysis of the first embodiment, for instance, if the wiring information data base DB3 stores information about wiring (A) as the wiring which may malfunction in response to voltage noise, a wiring structure, as shown in FIG. 5, where wiring (B) 4, which imparts voltage noise to wiring (A) 3, exists above and/or below wiring (A) 3 will be extracted. The structure analysis here can be a visual analysis using the actual layout data, however, it does not necessarily have to be a visual analysis.

In step S602, for instance, it is to be determined whether there are adjacent wirings in the same layer of wiring (A) 3 shown in FIG. 5. An adjacent wiring in this case, is defined as a wiring which is located in the vicinity of wiring (A) 3, and which is apart from wiring (A) 3 by a distance that is sufficient for a dummy pattern to be disposed. When there is an adjacent wiring in the same layer of wiring (A) 3 in step S602, then step S603 is to be executed. On the other hand, when there is no adjacent wiring in the same layer of wiring (A) 3 in step S602, then step S605 is to be executed.

Figure 6:
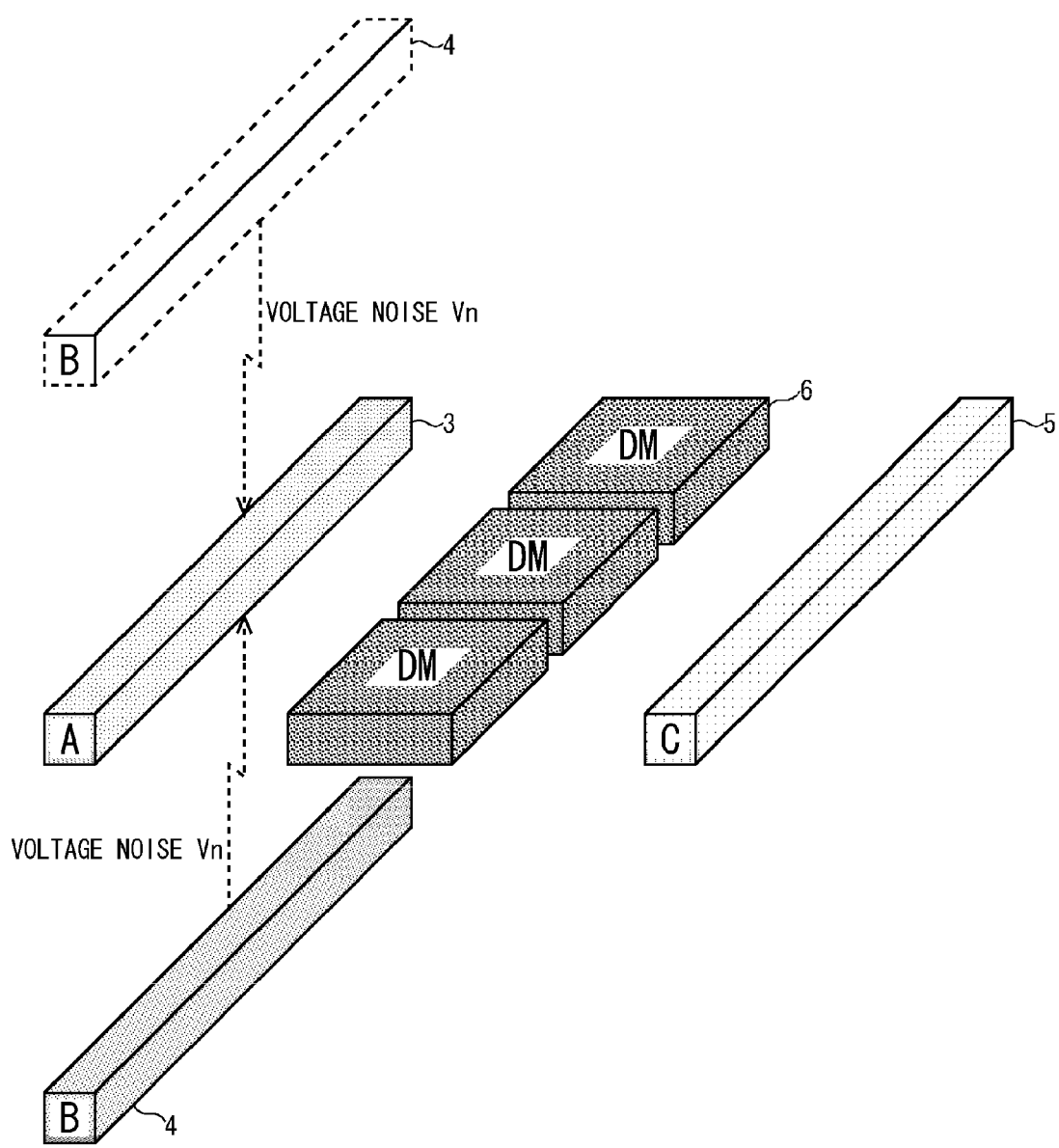
FIG. 6 is a diagram for explaining a physical relationship between a wiring which could be affected by a voltage noise, a wiring which imparts voltage noise and a wiring which is capable of receiving a voltage noise in the first embodiment of the present invention.

In step S603, for instance, when adjacent wiring (C) 5 exists in the same layer of wiring (A) 3 as shown in FIG. 6, it is to be determined whether adjacent wiring (C) 5 is capable of receiving voltage noise. Here, the wiring which is capable of receiving voltage noise, for instance, is a VDD wiring and a GND wiring, etc. If adjacent wiring (C) 5 is a wiring which should not receive voltage noise, i.e. if it is a signal wiring etc., the dummy pattern insertion process S600 should terminate without additionally inserting any dummy pattern between wiring (A) 3 and adjacent wiring (C) 5. On the other hand, if adjacent wiring (C) 5 is a wiring which is capable of receiving voltage noise, step S604 is to be executed.

Figure 7:
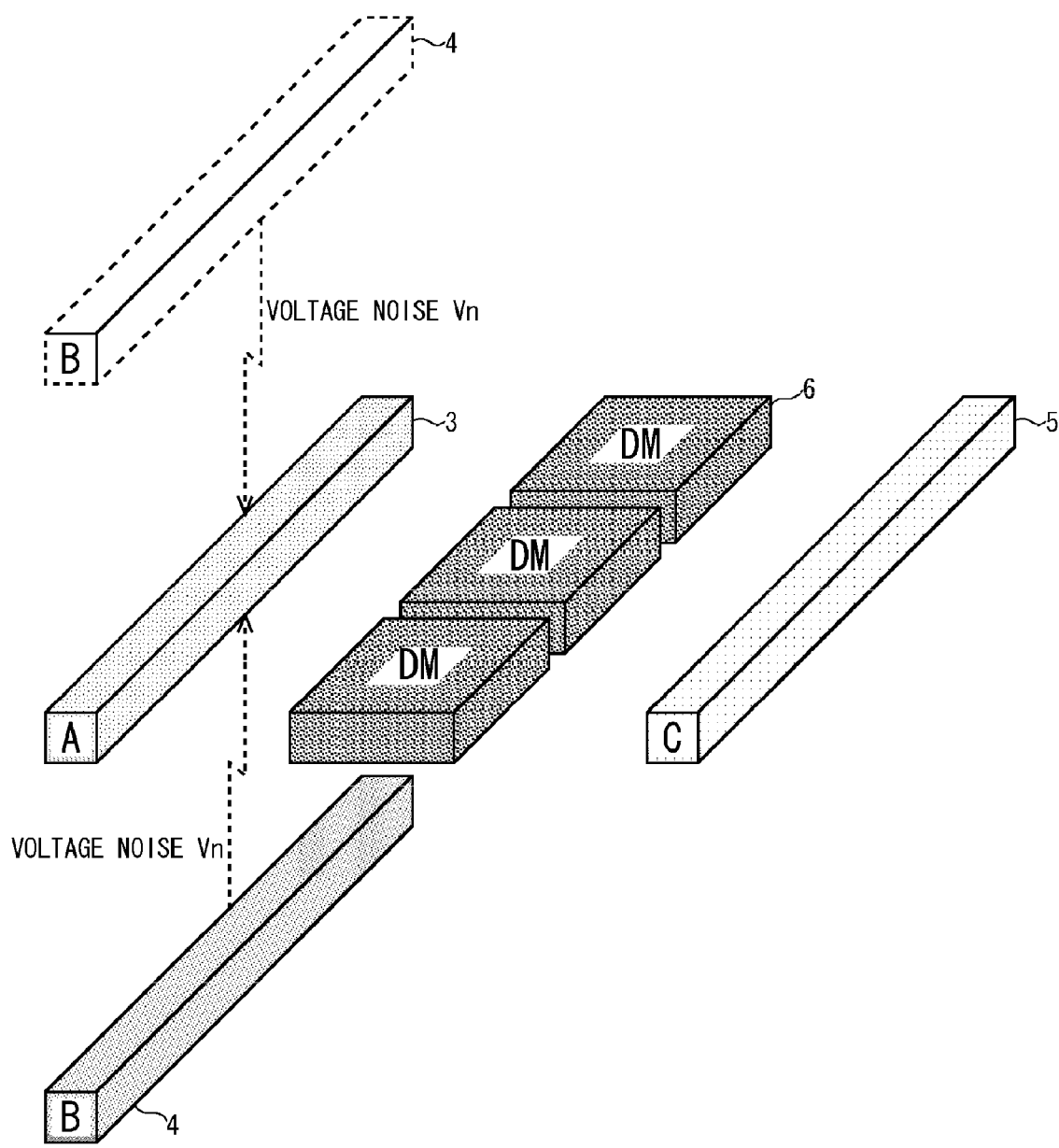
FIG. 7 is a diagram for explaining a dummy pattern disposal according to the first embodiment of the present invention.

In step S604, for instance, dummy patterns 6 are inserted additionally between wiring (A) 3 and adjacent wiring (C) 5 as shown in FIG. 7. The interval between the dummy patterns 6 and wiring (A) 3 or adjacent wiring (C) 5 should be appropriate if it is over the minimum interval value of wirings specified by the layout rules. Likewise, the size of the dummy pattern 6 should be appropriate if it is over the minimum size measurement of wirings specified by the layout rules.

In step S605, since there is no adjacent wiring in the same layer of wiring (A) 3, adjacent wiring (C) 5, which is capable of receiving voltage noise, is inserted in the same layer of wiring (A) 3 and dummy patterns 6 are additionally inserted between wiring (A) 3 and adjacent wiring (C) 5, as shown in FIG. 7, for instance. The interval between the dummy patterns 6 and wiring (A) 3 or adjacent wiring (C) 5 should be appropriate if it is over the minimum interval value of wirings specified by the layout rules. Likewise, the size of the dummy pattern 6 should be appropriate if it is over the minimum size measurement of wirings specified by the layout rules.

This is the overall flow of the dummy pattern insertion process S600.

Next, with reference to FIGS. 8A and 8B, the effects of dummy pattern insertion according to the first embodiment of the present invention will be described.

Figure 8A:
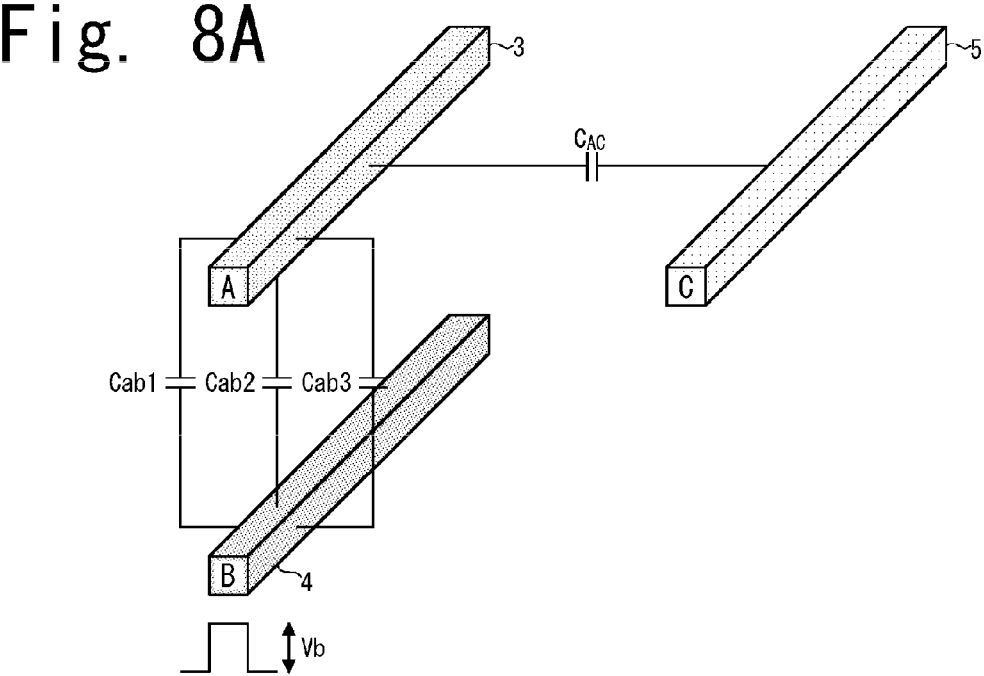
FIGS. 8A and 8B are diagrams for explaining possible changes in the parasitic capacitance in the first embodiment of the present invention.

FIG. 8A shows the parasitic capacitances generated between wirings when dummy patterns 6 are not disposed between wiring (A) 3, which receives voltage noise, and adjacent wiring (C) 5 positioned in the same layer. Here, in order to make the description simple, it is assumed that wiring (B) 4 which imparts voltage noise to wiring (A) 3 is located only in the lower layer below wiring (A) 3. In FIG. 8A, Cab1 and Cab3 are parasitic capacitances generated between the side faces of wiring (A) 3 and the side faces of wiring (B) 4, respectively, and Cab2 is a parasitic capacitance generated between the bottom surface of wiring (C) 3 and the upper surface of wiring (B) 4. $C_{AC}$ is a total parasitic capacitance generated between wiring (A) 3 and adjacent wiring (C) 5. Here, assuming that a signal voltage passing through wiring (B) 4 is Vb, the amount of voltage noise Vn which wiring (B) 4 imparts to wiring (A) 3 can be derived from Formula (1)

$$Vn = Vb \times (Cab1 + Cab2 + Cab3)/(Cab1 + Cab2 + Cab3 + C_{AC}) \quad (1)$$

Figure 8B:
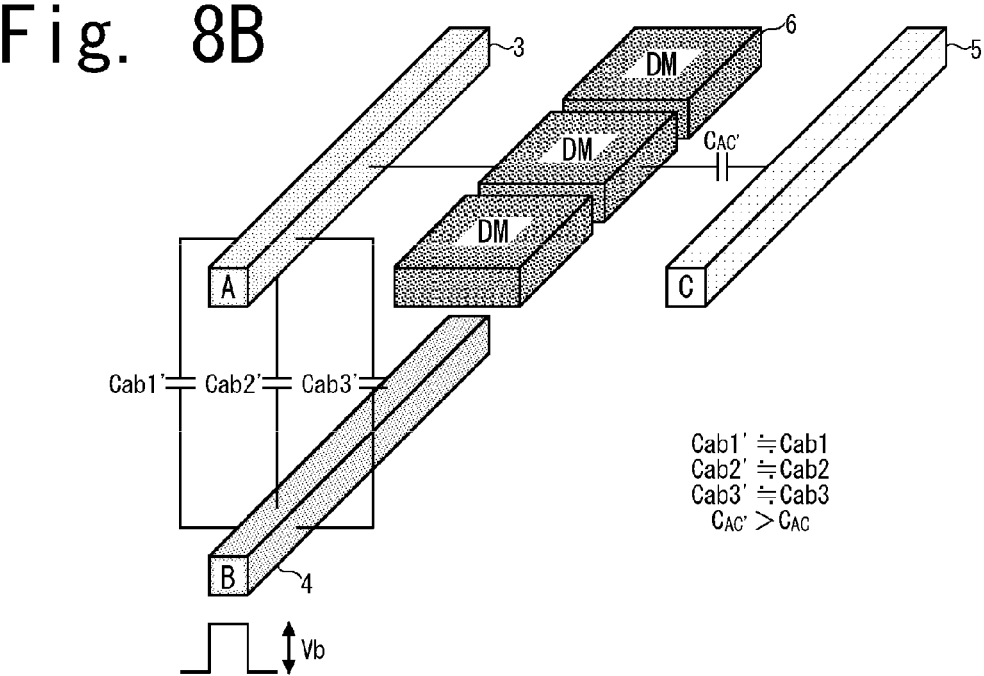

FIG. 8B shows the parasitic capacitances generated between wirings when dummy patterns 6 are disposed between wiring (A) 3, which receives voltage noise, and adjacent wiring (C) 5 positioned in the same layer. Here, in order to make the description simple, it is assumed that wiring (B) 4 which imparts voltage noise to wiring (A) 3 is located only in the lower layer below wiring (A) 3. In FIG. 8B, Cab 1' and Cab3' are parasitic capacitances generated between the side faces of wiring (A) 3 and the side faces of wiring (B) 4, respectively, and Cab2' is a parasitic capacitance generated between the bottom surface of wiring (A) 3 and the upper surface of wiring (B) 4. C. $C_{AC'}$ is a total parasitic capacitance generated between wiring (A) 3 and adjacent wiring (C) 5 through the dummy patterns 6. Here, considering that a signal voltage passing through wiring (B) 4 is Vb, the amount of voltage noise Vn' which wiring (B) 4 imparts to wiring (A) 3 can be derived from Formula (2).

$$Vn' = Vb \times (Cab1' + Cab2' + Cab') / (Cab1' + Caba2' + Cab3' + C_{AC'}) \quad (2)$$

Here, due to having the dummy patterns 6 disposed, a portion of the parasitic capacitances Cab1, Cab2 and Cab3. (FIG. 8A) generated between wiring (A) 3 and wiring (b) 4 might be distributed to the side of adjacent wiring (C) 5, which results in some increase/decrease in the capacitance value. However, such fluctuation is so small that it can be considered as almost zero. Therefore, it can be considered that Cab1'≅Cab1, Cab2'≅Cab2, Cab3'≅Cab3. On the other hand, since the effective interval between wiring (A) 3 and adjacent wiring (C) 5 becomes smaller due to having the dummy patterns 6 disposed, the total parasitic capacitance $C_{AC'}$ (FIG. 8B) becomes larger than the total parasitic capacitance $C_{AC}$ (FIG. 8A) generated between wiring (A) 3 and adjacent wiring (C) 5 (i.e. $C_{AC'} > C_{AC}$). At this time, under the conditions of $(Cab1' + Cab2' + Cab3')/(Cab1 + Cab2 + Cab3) << (C_{AC'}/C_{AC})$, $C_{AC'} > C_{AC}$, the condition Vn'<Vn will be realized between Formula (1) and Formula (2). Accordingly, by having the dummy patterns 6 disposed between wiring (A) 3, which receives voltage noise, and adjacent wiring (C) 5, which is positioned in the same layer, it is possible to decrease the amount of voltage noise that wiring (A) 3 is supposed to receive from wiring (B) 4.

FIG. 9 is a chart showing the amount of voltage noise that wiring (A) 3 receives from wiring (B) 4, with respect to the structures of FIG. 8A and FIG. 8B, respectively, the amount of voltage noise that wiring (A) 3 receives from wiring (B) 4 being derived as a result of a simulation.

In FIG. 9, an A-B inter-wiring total parasitic capacitance $C_{AB}$ corresponds to Cab1+Cab2+Cab3 in FIG. 8A and to Cab1'+Cab2'+Cab3' in FIG. 8B. An A-C inter-wiring total parasitic capacitance $C_{AC}$ corresponds to $C_{AC}$ in FIG. 8A and to $C_{AC'}$ in FIG. 8B. A total parasitic capacitance $C_{TOTAL}$ is a total amount derived by adding up the A-B inter-wiring total capacitance $C_{AB}$ and the A-C inter-wiring total parasitic capacitance $C_{AC}$ and the substrate capacitance $C_S$ generated between each wiring and the semiconductor substrate. Now assuming that the signal voltage passing through wiring (B) 4 is Vb, the amount of voltage noise Vn (Vn') which wiring (A) 3 receives from wiring (B) 4 can be acquired by Formula (3). In this simulation, the signal voltage Vb passing through wiring (B) 4 is assumed as 1.0 V, for example.

$$Vn = Vb \times C_{AB}/(C_{AB} + C_{AC} + \text{containership}) \quad (3)$$

Referring to FIG. 9, it is clear that by having the dummy patterns 6 disposed between wiring (A) 3, which receives voltage noise, and adjacent wiring (C) 5 positioned in the same layer, the A-B inter-wiring total capacitance $C_{AB}$ hardly changes while the A-C inter-wiring total parasitic capacitance $C_{AC}$ increases. By this arrangement, the amount of voltage noise Vn that wiring (A) 3 receives from wiring (B) 4 can be decreased by approximately 54%.

In the dummy pattern disposing method according to the first embodiment of the present invention, those wirings which could be affected by voltage noise are identified by first extracting a parasitic capacitance with respect to each wiring, and then executing the dynamic and static simulations using the parasitic capacitance to calculate the amount of voltage noise that each wiring imparts to its adjacent wiring. Then, considering the structure in which the wiring which imparts voltage noise (e.g. wiring (B) 4 in FIG. 5) is located above and/or below the wiring which is identified as one which may malfunction by receiving voltage noise (e.g. wiring (A) 3 in FIG. 5), by disposing the dummy patterns 6 between wiring (A) 3 and the wiring which is capable of receiving voltage noise (e.g. adjacent wiring (C) 5 in FIG. 6) located in the same layer of wiring (A) 3, it is possible to increase the parasitic capacitance between wiring (A) 3, which receives voltage noise, and adjacent wiring (C) 5, which is capable of receiving voltage noise. By this arrangement, it is possible to decrease the amount of voltage noise that the wiring, which may malfunction due to voltage noise, receives, and prevent possible malfunction of the semiconductor integrated circuit caused by voltage noise.

Second Embodiment

In this embodiment, a layout process of a semiconductor integrated circuit using a dummy pattern disposing method is the same as the layout process shown in FIG. 1 in the first embodiment of the present invention. Also, with respect to a dummy pattern disposing process in this embodiment, a basic flow is the same as the dummy pattern disposing process shown in FIG. 2 in the first embodiment of the present invention. In addition, in this embodiment, in the dummy pattern additional disposing process S300 shown in FIG. 2, a dummy pattern insertion process S700 (which will be described below) is implemented instead of the dummy pattern insertion process S600 in the first embodiment. In the following, the details of the dummy pattern insertion process S700 will be described.

Figure 10:
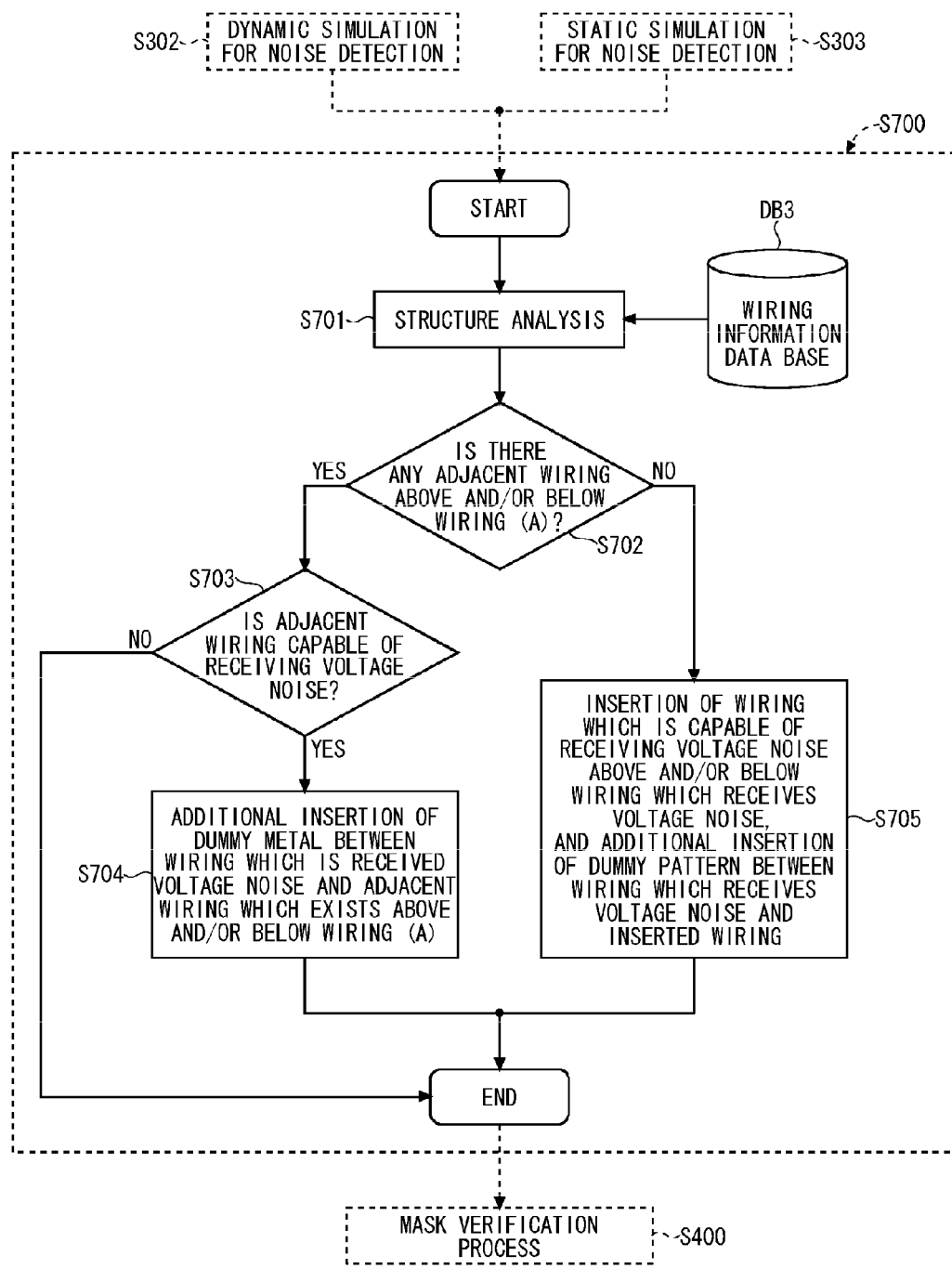
FIG. 10 is a flow chart showing a detailed process flow of a dummy pattern insertion process in the second embodiment of the present invention.

FIG. 10 is a flow chart showing a detailed process flow of the dummy pattern insertion process S700.

Figure 11:
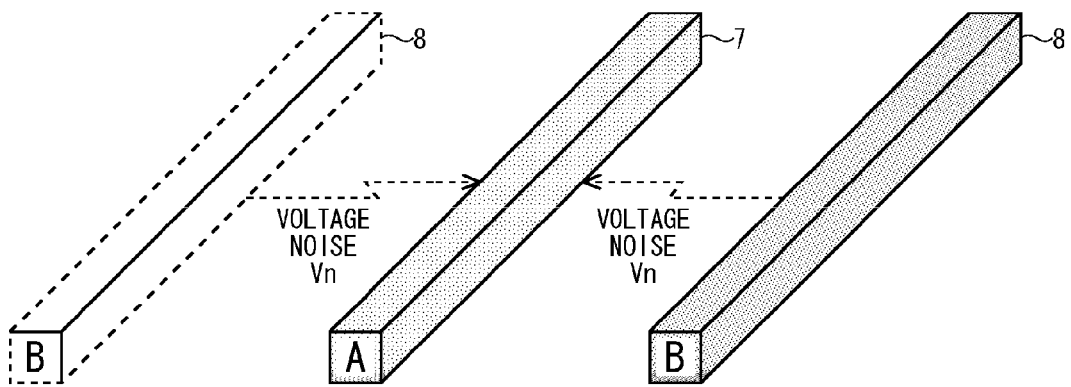
FIG. 11 is a diagram for explaining a physical relationship between a wiring which could be affected by a voltage noise and a wiring which imparts voltage noise in the second embodiment of the present invention.

In step S701, analysis of the wiring structure is done using the wiring information data base DB3. In the structure analysis of the second embodiment, for instance, if the wiring information data base DB3 stores information about wiring (A) as one which may malfunction in response to voltage noise, a wiring structure, as shown in FIG. 11, where wiring (B) 8, which imparts voltage noise to wiring (A) 7, exists in parallel with one or both sides of the wiring (A) 7 in the same layer of wiring (A) 7 will be extracted. The structure analysis here can be visual analysis using actual layout data, however, it does not necessarily have to be a visual analysis.

In step S702, for instance, it is to be determined whether there are adjacent wirings above and/or below wiring (A) 7 shown in FIG. 11. When there is an adjacent wiring above and/or below wiring (A) 7 in step S702, then step S703 is to be executed. On the other hand, when there is no adjacent wiring above and below wiring (A) 7 in step S702, then step S705 is to be executed.

In step S703, for instance, when adjacent wiring (C) 9 exists above and/or below wiring (A) 7 as shown in FIG. 12, it is to be determined whether adjacent wiring (C) 9 is capable of receiving voltage noise. Here, the wiring which is capable of receiving voltage noise, for instance, is a VDD wiring and a GND wiring, etc. If adjacent wiring (C) 9 is wiring which should not receive voltage noise, i.e. if it is a signal wiring etc., the dummy pattern insertion process S700 should terminate without additionally inserting any dummy pattern between wiring (A) 7 and adjacent wiring (C) 9. On the other hand, if adjacent wiring (C) 9 is a wiring which is capable of receiving voltage noise, step S704 is to be executed.

Figure 13:
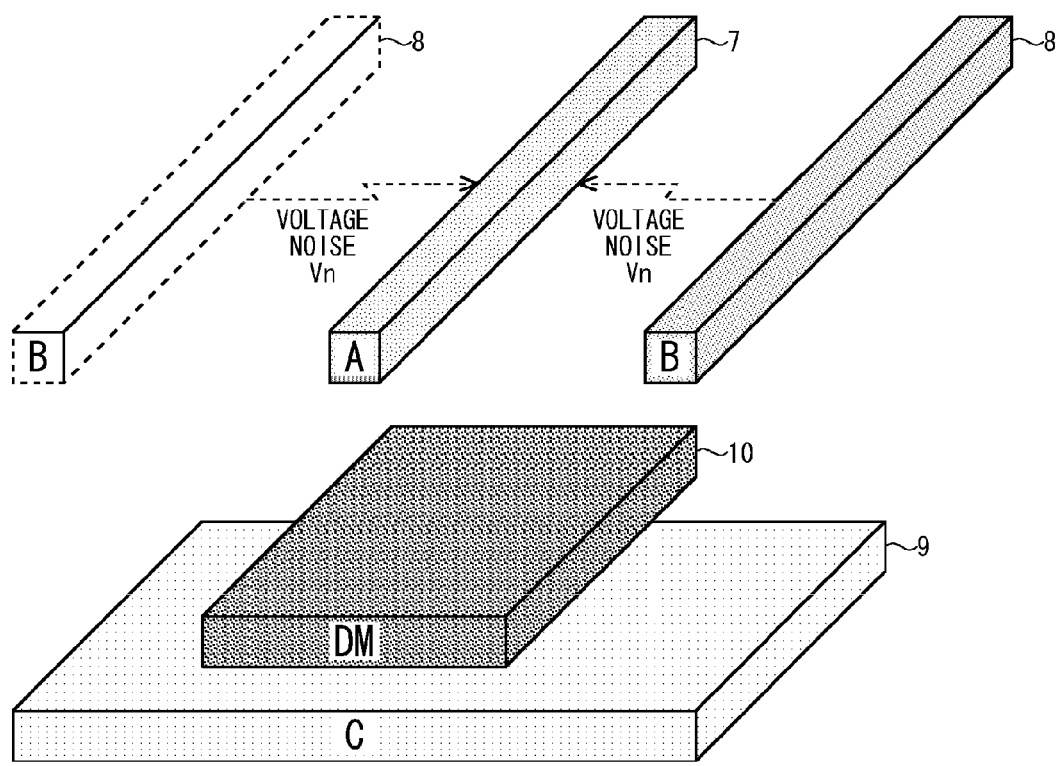
FIG. 13 is a diagram for explaining a dummy pattern disposal according to the second embodiment of the present invention.

In step S704, for instance, a wiring layer is inserted between the layer where wiring (A) 7 is formed and the layer where wiring (C) 9 disposed below wiring (A) 7 is formed, and a dummy pattern 10 is additionally formed on the inserted wiring layer so that it is inserted between wiring (A) 7 and wiring (C) 9 as shown in FIG. 13. The size of the dummy pattern 10 should be appropriate if it is over the minimum size measurement of wirings specified by the layout rules.

In step S705, since there is no adjacent wiring above and/or below wiring (A) 7, adjacent wiring (C) 9, which is capable of receiving voltage noise, is inserted in the below layer of wiring (A) 7, and after a wiring layer is inserted between the layer where wiring (A) 7 is formed and the layer where the wiring (C) 9 is formed, a dummy pattern 10 is additionally formed on the inserted wiring layer so that it is inserted between wiring (A) 7 and wiring (C) 9, as shown in FIG. 13, for instance. The size of the dummy pattern 10 should be appropriate if it is over the minimum size measurement of wirings specified by the layout rules.

This is the overall flow of the dummy pattern insertion process 5700.

Next, with reference to FIGS. 14A and 14B, the effects of dummy pattern insertion according to the second embodiment of the present invention will be described.

Figure 14A:
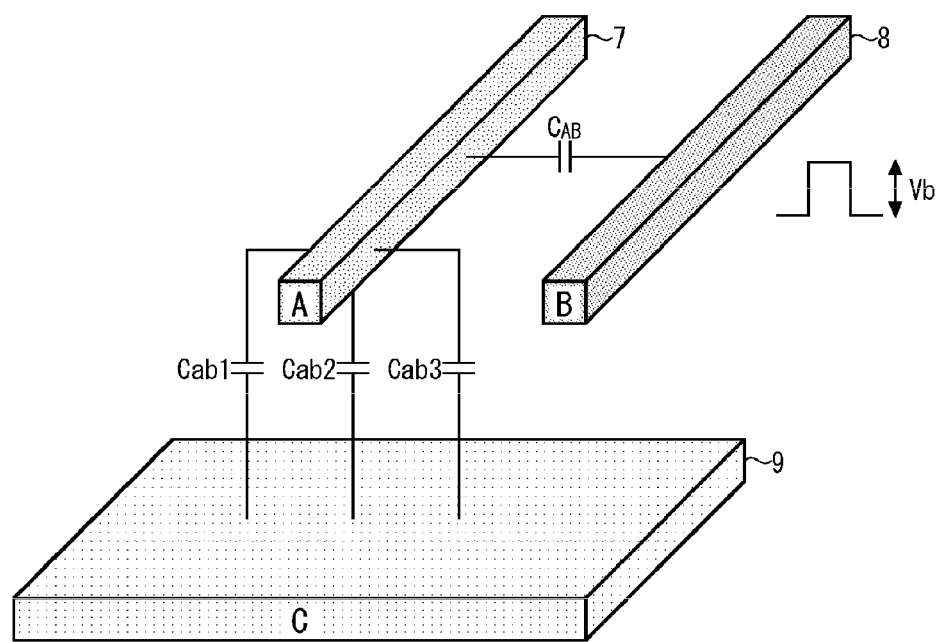
FIGS. 14A and 14B are diagrams for explaining possible changes in the parasitic capacitance in the second embodiment of the present invention.

FIG. 14A shows the parasitic capacitances generated between wirings when dummy patterns 10 are not disposed between wiring (A) 7, which receives voltage noise, and adjacent wiring (C) 9 positioned in the lower layer below wiring (A) 7. Here, in order to make the description simple, it is assumed that wiring (B) 8 which imparts voltage noise to wiring (A) 7 is located at only one side of wiring (A) 7 in the same layer. In FIG. 8A, Cac1 and Cac3 are parasitic capacitances generated between the side faces of wiring (A) 7 and adjacent wiring (C) 9, respectively, and Cac2 is a parasitic capacitance generated between the bottom surface of wiring (A) 7 and adjacent wiring (C) 9. $C_{AB}$ is a total parasitic capacitance generated between wiring (A) 7 and wiring (B) 8. Here, assuming that a signal voltage passing through wiring (B) 8 is Vb, the amount of voltage noise Vn which wiring (B) 8 imparts to wiring (A) 7 can be derived from Formula (4)

$$Vn = Vb \times C_{AB}/(Cac1 + Cac2 + Cac3 + C_{AB}) \quad (4)$$

Figure 14B:
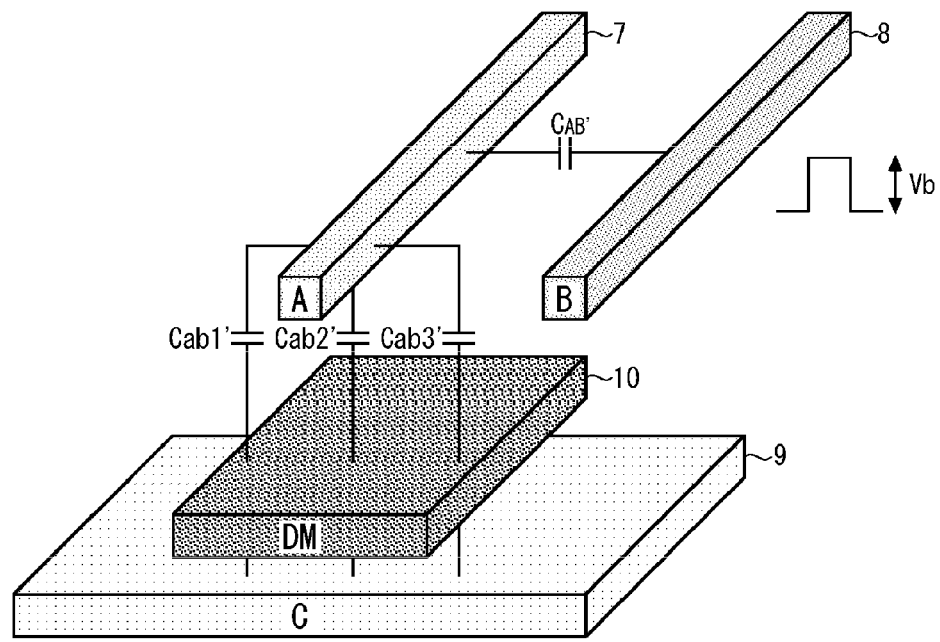

FIG. 14B shows the parasitic capacitances generated between wirings when dummy patterns 10 are disposed between wiring (A) 7, which receives voltage noise, and adjacent wiring (C) 9 positioned in the lower layer below wiring (A) 7. Here, in order to make the description simple, it is assumed that wiring (B) 8 which imparts voltage noise to wiring (A) 7 is located at only one side of wiring (A) 7 in the same layer. In FIG. 14B, Cac1' and Cac3' are parasitic capacitances generated between the side faces of wiring (A) 7 and adjacent wiring (C) 9 through the dummy pattern 10, respectively, and Cac2' is a parasitic capacitance generated between the bottom surface of wiring (A) 7 and the upper surface of adjacent wiring (C) 9. C $C_{AB'}$ is a total parasitic capacitance generated between wiring (A) 7 and wiring (B) 8. Here, considering that a signal voltage passing through wiring (B) 8 is Vb, the amount of voltage noise Vn' which wiring (B) 8 imparts to wiring (A) 7 can be derived from Formula (5).

$$Vn' = Vb \times C_{AB'}/(Cac1' + Cac2' + Cac3' + C_{AB'}) \quad (5)$$

Here, due to having the dummy pattern 10 disposed, a portion of the total parasitic capacitance $C_{AB}$ (FIG. 14A) generated between wiring (A) 7 and wiring (B) 8 might be distributed to the side of adjacent wiring (C) 9 in the lower layer below the wiring (A) 7. Therefore, the total parasitic capacitance $C_{AB'}$ (FIG. 14B) becomes smaller than the total parasitic capacitance $C_{AB}$ (FIG. 14A) generated between wiring (A) 7 and wiring (B) 8 (i.e. $C_{AB'} < C_{AB}$). On the other hand, since the effective interval between wiring (A) 7 and adjacent wiring (C) 9 located in the lower layer below wiring (A) 7 becomes smaller due to having the dummy pattern 10 disposed, the parasitic capacitances Cac1', Cac2' and Cac3' (FIG. 14B) become larger than the parasitic capacitances Cac1, Cac2 and Cac3 (FIG. 14A) generated between wiring (A) 7 and adjacent wiring (C) 9 (i.e. Cac1'>Cac1, Cac2'>Cac2, Cac3'>Cac3). Thereby, under the conditions of (Cac1'+Cac2'+Cac3')>(Cac1+Cac2+Cac3), $C_{AB'} < C_{AB}$, a condition as Vn'<Vn will be realized between Formula (4) and (5). Accordingly, by having the dummy pattern 10 disposed between wiring (A) 7, which receives voltage noise, and adjacent wiring (C) 9, which is positioned in the lower layer below wiring (A) 7, it is possible to decrease the amount of voltage noise that wiring (A) 7 is supposed to receive from wiring (B) 8.

In the dummy pattern disposing method according to the second embodiment of the present invention, those wirings which could be affected by voltage noise are identified by first extracting a parasitic capacitance with respect to each wiring, and then executing the dynamic and static simulations using the parasitic capacitance to calculate the amount of voltage noise that each wiring imparts to its adjacent wiring. Then, considering the structure in which the wiring which imparts voltage noise (e.g. wiring (B) 8 in FIG. 11) is located in the same layer and in parallel with the wiring which is identified as one which may malfunction by receiving voltage noise (e.g. wiring (A) 7 in FIG. 11), by disposing the dummy patterns 10 between wiring (A) 7 and the wiring which is capable of receiving voltage noise (e.g. adjacent wiring (C) 9 in FIG. 12) located above and/or below wiring (A) 7, it is possible to decrease the parasitic capacitance between wiring (A) 7, which received voltage noise, and wiring (B) 8, which imparts voltage noise. By this arrangement, it is possible to decrease the amount of voltage noise that the wiring, which may malfunction due to voltage noise, receives, and prevent possible malfunction of the semiconductor integrated circuit caused by voltage noise.

Third Embodiment

Figure 15:
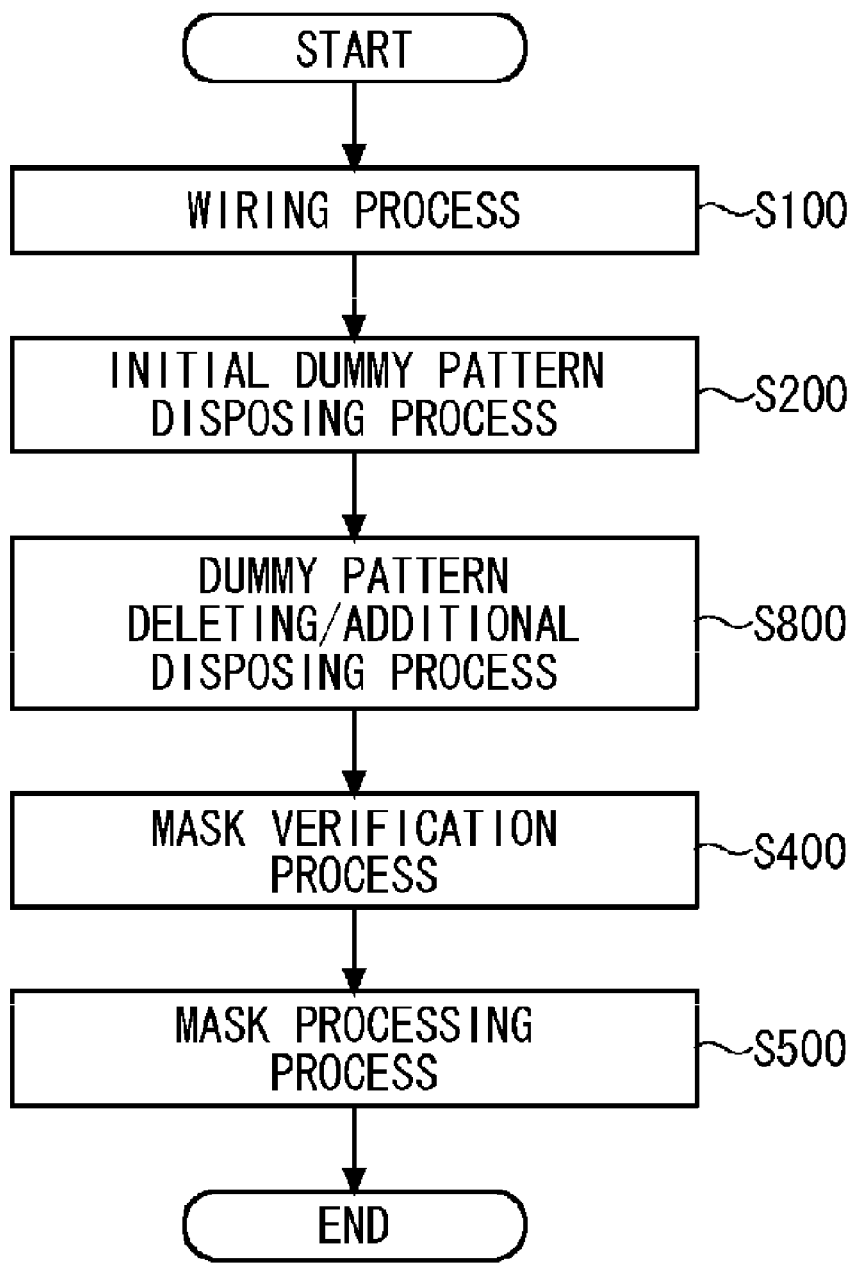
FIG. 15 is a flow chart showing an example of a layout process of a semiconductor integrated circuit using a dummy pattern disposing method according to a third embodiment of the present invention.

FIG. 15 is a flow chart showing an example of a layout process of a semiconductor integrated circuit using a dummy pattern disposing method according to a third embodiment of the present invention. In addition, in this embodiment, in this embodiment, instead of the dummy pattern additional insertion process S300 in the dummy pattern disposing method in the first and second embodiments shown in FIG. 1, a dummy pattern deleting/additional disposing process S800 (which will be described below) is implemented. The rest of the structure of the layout process according to the third embodiment of the present invention is the same as the first or second embodiment, and as for the structure elements that are the same as the first and second embodiments, the same reference numbers will be used, and redundant explanation of those structure elements will be omitted. In the following, details of the dummy pattern insertion process S700 will be described.

Figure 16:
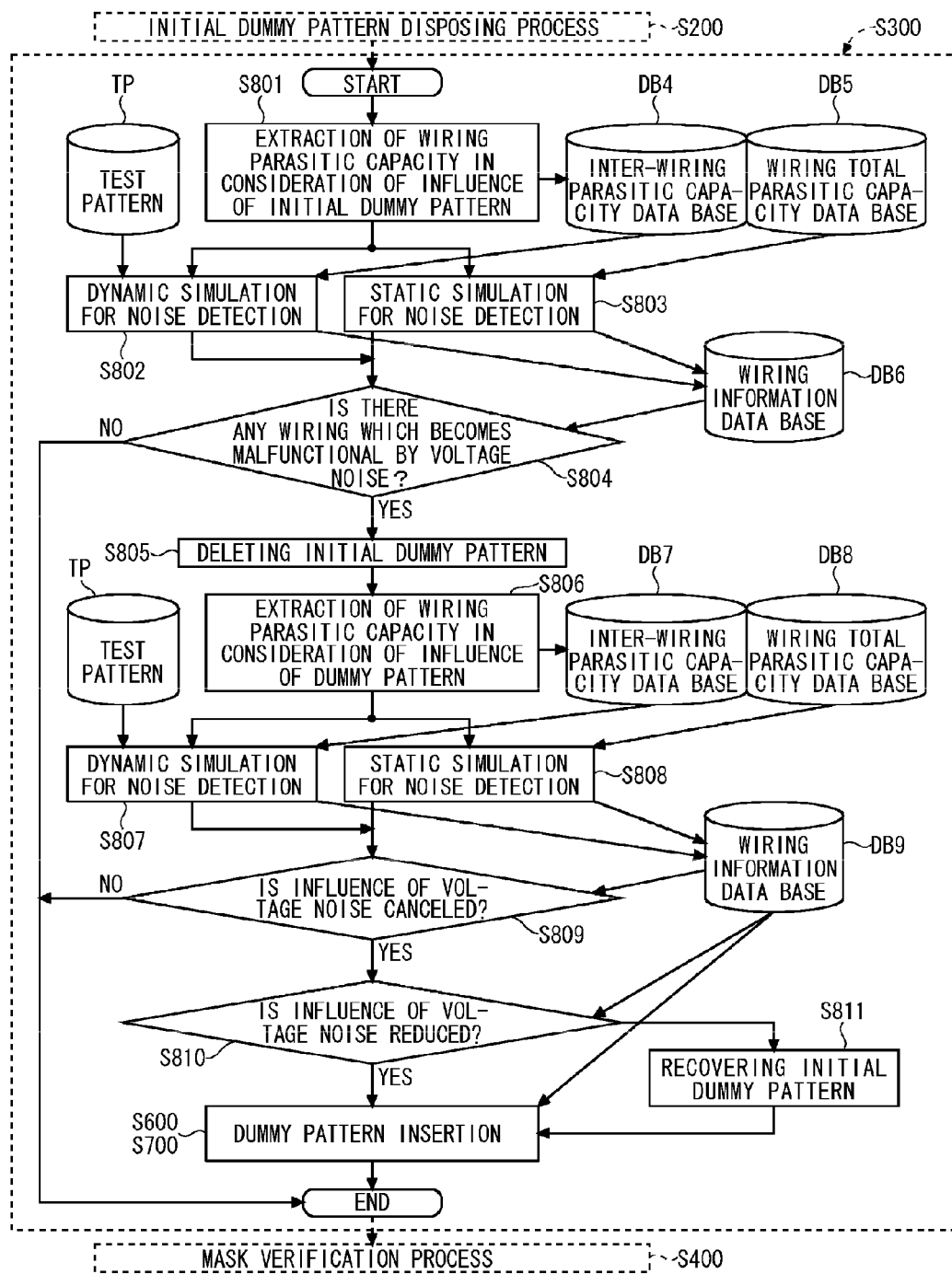
FIG. 16 is a flow chart showing a detailed process flow of a dummy pattern deleting/additional disposing process in the third embodiment of the present invention.

FIG. 16 is a flow chart showing a detailed process flow of the dummy pattern deleting/additional disposing process S800.

In step S801, layout data, i.e. wiring pattern data and initial dummy metal pattern data, generated in the wiring process S100 (FIG. 1) and the initial dummy pattern disposing process S200 (FIG. 2) is used to extract a parasitic capacitance with respect to each wiring. The parasitic capacitance extracted here includes inter-wiring parasitic capacitances and a wiring total parasitic capacitance. The inter-wiring parasitic capacitance is a parasitic capacitance generated between adjacent wirings, and the wiring total parasitic capacitance is derived by adding a substrate capacitance generated between the wiring and the semiconductor substrate to the inter-wiring parasitic capacitance. On the basis of the inter-wiring parasitic capacitances and the wiring total parasitic capacitance extracted in step S801, inter-wiring parasitic capacitance data base DB4 and wiring total parasitic capacitance data base DB5 are generated. These data bases store information, for instance, about a node name of the wiring, a parasitic capacitance with respect to that node and so forth.

In step S802, a dynamic simulation for identifying the wirings which could be affected by voltage noise is performed using the inter-wiring parasitic capacitance data base DB4 (first inter-wiring parasitic capacitance data base) and the wiring total parasitic capacitance data base DB5 (first wiring total parasitic capacitance data base). In this dynamic simulation, several test patterns TP are used to virtually operate the circuit and calculate dynamically the amount of voltage noise that each wiring imparts to the adjacent wirings. Then those wirings which may malfunction due to such voltage noise, i.e. those wirings having a possibility of receiving voltage noise with a level surpassing a predetermined basis, are identified as the wirings which could be affected by voltage noise. As to a judging standard for identifying a wiring which is capable of receiving voltage noise, as in the case of the first embodiment, by assuming that the amount of voltage noise surpasses the threshold voltage Vth of the transistor connected to a wiring, it will be possible to specifically identify the wiring which could be affected by voltage noise. The judging standard does not necessarily have to be based on the comparison between the amount of voltage noise Vn and the threshold voltage Vth of the transistor, and it is also possible to set different judging standard as appropriate. Then on the basis of the results of the dynamic simulation and the static simulation, which will be described below, wiring information data base DB6 containing information about the wirings which may malfunction in response to voltage noise is produced. This wiring information data base DB6 stores a node name, amount of voltage noise, etc. of the wirings which may malfunction due to voltage noise.

In step S803, a static simulation for identifying the wirings which could be affected by voltage noise is performed using the inter-wiring parasitic capacitance data base DB4 and the wiring total parasitic capacitance data base DB5. In this static simulation, the amount of voltage noise that each wiring imparts to the adjacent wirings is calculated statically without using any test pattern. Then those wirings which may malfunction due to such voltage noise, i.e. those wirings having a possibility of receiving voltage noise with a level surpassing a predetermined basis, are identified as the wirings which could be affected by voltage noise. As to a specific method of identifying the wirings which could be affected by voltage noise, it is the same as the case of the dynamic simulation. Then as mentioned before, on the basis of the results of the dynamic simulation and the static simulation, wiring information data base DB6 containing information about the wirings which may malfunction in response to voltage noise is produced. This wiring information data base DB6 stores a node name, amount of voltage noise, etc. of the wirings which may malfunction due to voltage noise.

In step S804, on the basis of the wiring information data base DB6 generated through the dynamic simulation and the static simulation, it is to be determined whether there are wirings which could be affected by voltage noise. If there is no wiring which could be affected by voltage noise, i.e. if the wiring information data base DB6 does not store information of wirings which may malfunction due to voltage noise, the dummy pattern deleting/additionally disposing process S800 should terminate. On the other hand, if there is a wiring which could be affected by voltage noise, i.e. if the wiring information data base DB6 has information of wiring which may malfunction due to voltage noise (hereinafter to be referred to as error information), the dummy pattern deleting/additionally disposing process S800 is to be executed.

In step S805, with respect to the wiring of which error information is stored in the wiring information data base DB6, i.e. with respect to the wiring which could be affected by voltage noise, a process of deleting an initial dummy pattern which adjoins this wiring or downsizing the initial dummy pattern is to be executed.

In step S806, parasitic capacitances capacities, i.e. inter-wiring parasitic capacitances and a wiring total parasitic capacitance with respect to each wiring are extracted again using the layout data of which the initial dummy pattern which adjoins the wiring, which could be affected by voltage noise, is deleted or downsized. Then, on the basis of the inter-wiring parasitic capacitances and the wiring total parasitic capacitance extracted in step S806, inter-wiring parasitic capacitance data base DB7 and wiring total parasitic capacitance data base DB8 are generated. These data bases store information, for instance, about a node name of the wiring, a parasitic capacitance with respect to that node, and so forth.

In step S807, in order to confirm the results of step S805 which is done with respect to the wiring which could be affected by voltage noise, i.e. the results of deleting or downsizing the initial dummy pattern which adjoins the wiring which could be affected voltage noise, a dynamic simulation is performed again using the inter-wiring parasitic capacitance data base DB7 and the wiring total parasitic capacitance data base DB8. In this dynamic simulation, as in the case of the dynamic simulation in step S802, several test patterns TP are used to virtually operate the circuit and calculate dynamically the amount of voltage noise that each wiring imparts to the adjacent wirings. Then on the basis of the results of the dynamic simulation and the static simulation, which will be described below, wiring information data base DB9 is produced. This wiring information data base DB9 stores a node name; amount of voltage noise, etc. of the wirings which may malfunction due to voltage noise.

In step S808, in order to confirm the results of step S805 which is done with respect to the wiring which could be affected by voltage noise, i.e. the results of deleting or downsizing the initial dummy pattern which adjoins the wiring which could be affected by voltage noise, a static simulation is performed again using the inter-wiring parasitic capacitance data base DB7 and the wiring total parasitic capacitance data base DB8. In this static simulation, as in the case of the static simulation in step S803, the amount of voltage noise that each wiring imparts to the adjacent wirings is calculated statically without using any test pattern. Then as mentioned before, on the basis of the results of the dynamic simulation and the static simulation, wiring information data base DB9 is produced. This wiring information data base DB9 stores a node name, amount of voltage noise, etc. of the wirings which could become malfunctional due to voltage noise.

In step S809, on the basis of the wiring information data base DB9 generated through the dynamic simulation and the static simulation, it is to be determined whether the influence of voltage noise is canceled by deleting or downsizing the initial dummy pattern which adjoins the wiring which could be affected by voltage noise. If the influence of voltage noise is canceled, i.e. if the wiring information data base DB9 does not store error information, the dummy pattern deleting/additional disposing process S800 should terminate. On the other hand, if the influence of voltage noise is not canceled, i.e. if the wiring information data base DB9 stores error information, step S810 is to be executed.

In step S810, the amounts of voltage noise are compared between the wiring information data base DB6 before the initial dummy pattern is deleted or downsized in step S805 and the wiring information data base DB9 after the initial dummy pattern is deleted or downsized in step S805, with respect to each wiring which could be affected by voltage noise. If there is at least one wiring in which the amount of voltage noise in the wiring information data base DB9 is more than the amount of voltage noise thereof in the wiring information data base DB6, step S811 is to be executed with respect to every wiring of which amount of voltage noise is increased after step S805. On the other hand, if there is no wiring in which the amount of voltage noise in the wiring information data base DB9 is more than the amount of voltage noise thereof in the wiring information data base DB6, step S600 (FIG. 4) or step S700 (FIG. 10) is to be executed.

In step S811, wirings of which amount of voltage noise is increased after step S805, where the initial dummy pattern which adjoins the wiring which could be affected by voltage noise, are recovered to the initial state. Then, step S600 (FIG. 4) or step S700 is to be executed.

In step 600 (FIG. 4) or in step S700 (FIG. 10), the additional insertion of dummy patterns considering the influence of voltage noise is performed by a certain method which is described in the first or the second embodiment. The details of S600 and S700 are already described in the first and second embodiments, and therefore, they will not be described again for this case.

In the dummy pattern disposing method according to the third embodiment of the present invention, with respect to the wiring which could be affected by voltage noise, first the process of deleting or downsizing the initial dummy pattern which adjoins the wiring which could be affected by voltage noise (step S805) is performed. Then, if the influence of voltage noise is not canceled after deleting or downsizing the initial dummy pattern which adjoins the wiring which could be affected by voltage noise, it is to be determined whether the influence of voltage noise is decreased by deleting or downsizing this initial dummy pattern (step S810). If the influence of voltage noise is decreased as a result of step S810, additional dummy patterns are inserted (step S600 or S700). On the other hand, if the influence of voltage noise is not decreased as a result of step S810, after the deleted or downsized initial dummy patterns in step S805 are recovered to the initial state (step S811), additional dummy patterns are inserted (step S600 or S700). With this processes, it is possible to reduce the number of additional dummy patterns based on the circumstance of voltage noise, and therefore manufacturing cost can be decreased even more as compared to the first and second embodiment.

Fourth Embodiment

In a method of disposing a dummy pattern according to a fourth embodiment of the present invention, a dummy pattern is disposed so that connection dividing capacitors, i.e. decoupling capacitors, are formed between power supply wirings.

Figure 17A:
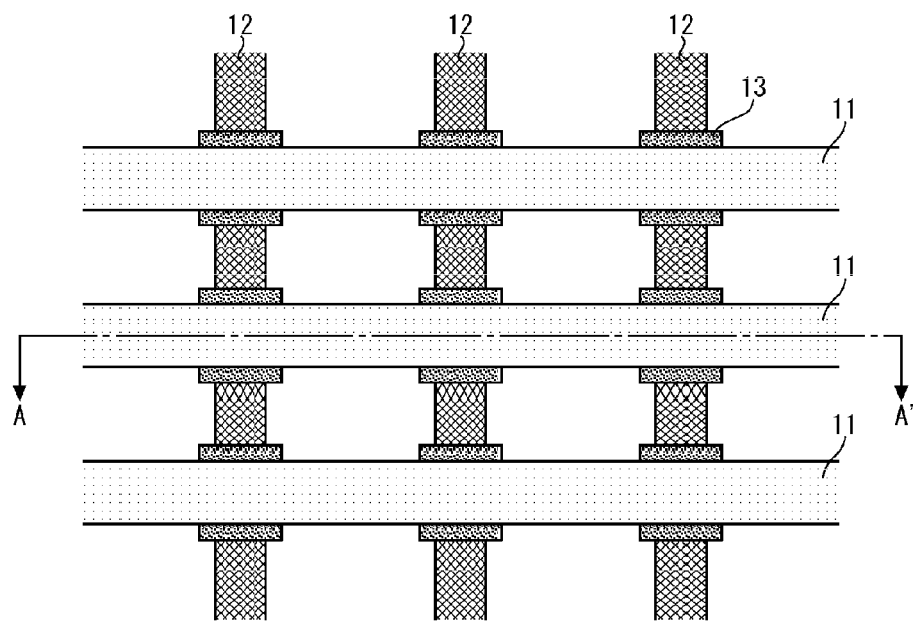
FIGS. 17A and 17B are diagrams showing a portion of a wire structure in a semiconductor integrated circuit using a dummy pattern disposing method according to a fourth embodiment of the present invention.
Figure 17B:
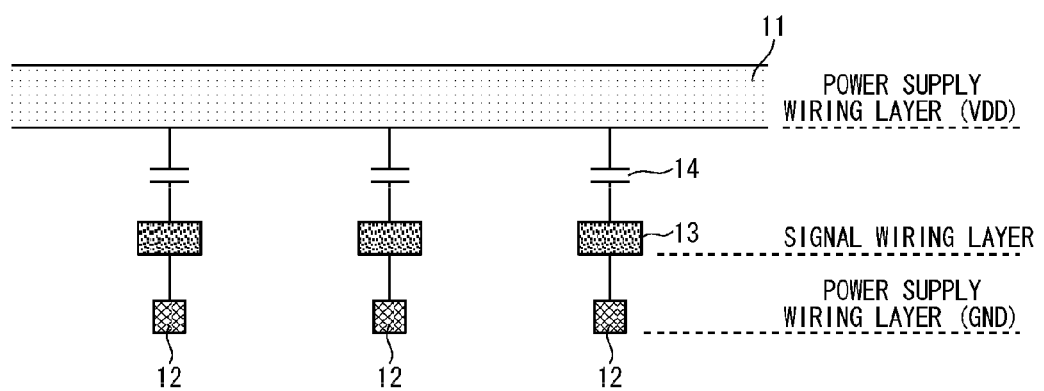

FIGS. 17A and 17B are diagrams showing a portion of a wire structure in a semiconductor integrated circuit using a dummy pattern disposing method according to a fourth embodiment of the present invention. FIG. 17A is a plan view of the wiring structure, and FIG. 17B is a sectional view of the wiring structure taken along a line A-A' shown in FIG. 17A.

In a semiconductor integrated circuit such as an application specific integrated circuit, i.e. an ASIC, or the like, as shown in FIG. 17A, a structure where layers for power supply wirings and layers for signal wirings are alternately laminated is generally used. Moreover, wirings formed in different layers, e.g. a VDD wiring 11 and a GND wiring 12 shown in FIG. 17B, are arranged so that they may run at right angles to one another. In this structure, when it is viewed from the upper portion, a mesh structure is formed by a VDD wiring 11 and a GND wiring 12. In this embodiment, in a signal wiring layer located between a power supply wiring layer where the VDD wiring 11 is formed and a power supply wiring layer where the GND wiring 12 is formed, dummy pattern 13 is disposed on the region corresponding to the crossover point where the VDD wiring 11 and the GND wiring 12 cross. With this structure where the dummy pattern 13 is disposed as mentioned above, since the effective interval between the VDD wiring 11 and the GND wiring 12 becomes smaller, it is possible to form a decoupling capacitor which has a large capacitance between the VDD wiring 11 and the GND wiring 12.

In the dummy pattern disposing method according to the fourth embodiment of the present invention, due to disposing the dummy pattern 13 between the VDD wiring 11 and the GND wiring 12, it is possible to increase a capacitance between the power supply wirings. Thereby, it becomes easily and simply possible to form the decoupling capacitor 14 which has a large capacitance and stabilize a power supply voltage inside the semiconductor integrated circuit.

This application claims priority to Japanese Patent Application No. 2005-9626. The entire disclosures of Japanese Patent Application No. 2005-9626 is hereby incorporated herein by reference.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents. Thus, the scope of the invention is not limited to the disclosed embodiments.

The term "configured" as used herein to describe a component, section or portion of a device includes hardware and/or software that is constructed and/or programmed to carry out the desired function.

Moreover, terms that are expressed as "means-plus function" in the claims should include any structure that can be utilized to carry out the function of that portion of the present invention.

The terms of degree such as "substantially," "about," and "approximately" as used herein mean a reasonable amount of deviation of the modified term such that the end result is not significantly changed. For example, these terms can be construed as including a deviation of at least .+−0.5% of the modified term if this deviation would not negate the meaning of the word it modifies.

What is claimed is:

1. A method of disposing a dummy pattern used for a semiconductor integrated circuit having a multilevel wiring structure, the method comprising the steps of:
    obtaining a first inter-wiring parasitic capacitance and a first wiring total parasitic capacitance for each wiring using wiring layout data of the semiconductor integrated circuit and initial dummy pattern layout data;
    creating a first inter-wiring parasitic capacitance data base based on the first inter-wiring parasitic capacitance;
    creating a first wiring total parasitic capacitance data base based on the first wiring total parasitic capacitance;
    performing a first dynamic simulation for identifying a first wiring affected by voltage noise, by using the first inter-wiring parasitic capacitance data base and a first wiring total parasitic capacitance data base;
    performing a first static simulation for identifying a second wiring affected by voltage noise, by using the first inter-wiring parasitic capacitance data base and the first wiring total parasitic capacitance data base;
    creating a first wiring information data base storing the results of the first dynamic simulation and the first static simulation, the results of the first dynamic simulation being information about the first wiring, and the results of the first static simulation being information about the second wiring;
    analyzing the capacitance of the first and second wirings based on the data in the first wiring information data base;
    performing an additional insertion of a dummy pattern near a third wiring in the initial dummy pattern, the third wiring being determined to be a wiring which may be affected by voltage noise based on the result of the analysis on the capacitance of the first and second wirings; and
    fabricating the semiconductor integrated circuit, the fabricating step including a step of making an exposure using a mask having a mask pattern corresponding to the initial dummy pattern.

2. The method of disposing a dummy pattern according to claim 1, further comprising the step of: judging whether or not a fifth wiring that adjoins the third wiring exists on at least one of a same layer as the third wiring, above the third wiring, and below the third wiring.

3. The method of disposing a dummy pattern according to claim 2, further comprising the steps of: disposing a sixth wiring adjoining the third wiring on at least one of the same layer as the third wiring, above the third wiring, and below the third wiring when the fifth wiring does not exist, the sixth wiring capable of being affected by voltage noise; and disposing a dummy pattern between the third wiring and the sixth wiring.

4. The method of disposing a dummy pattern according to claim 3, wherein the fifth wiring which is judged to be capable of being affected by voltage noise is a VDD wiring or a GND wiring.

5. The method of disposing a dummy pattern according to claim 2, further comprising the step of: judging whether or not the fifth wiring is a wiring that is capable of being affected by voltage noise, when it is judged that the fifth wiring does exist.

6. The method of disposing a dummy pattern according to claim 5, further comprising: disposing a dummy pattern between the third wiring and the fifth wiring, when it is judged that the fifth wiring is capable of being affected by voltage noise.

7. The method of disposing a dummy pattern according to claim 6, wherein the fifth wiring which is judged to be capable of being affected by voltage noise is a VDD wiring or a GND wiring.

8. The method of disposing a dummy pattern according to claim 5, wherein the dummy pattern is not disposed between the third wiring and the fifth wiring, when it is judged that the fifth wiring is a wiring which is not capable of being affected by voltage noise.

9. The method of disposing a dummy pattern according claim 8, wherein the fifth wiring which is judged to be a wiring which is not capable of being affected by voltage noise is a signal wiring.

10. The method of disposing a dummy pattern according to claim 1, wherein the third wiring adjoins a fourth wiring which imparts voltage noise to the third wiring, the fourth wiring existing on at least one of the upper portion of the third wiring, the lower portion of the third wiring, and the same layer as the third wiring.

11. The method of disposing a dummy pattern according to claim 10, further comprising the step of: judging whether or not a fifth wiring that adjoins the third wiring exists on at least one of the same layer as the third wiring, the upper portion of the third wiring, and the lower portion of the third wiring.

12. The method of disposing a dummy pattern according to claim 11, further comprising the steps of: disposing a sixth wiring adjoining the third wiring on at least one of the same layer as the third wiring, the upper portion of the third wiring, and the lower portion of the third wiring when the fifth wiring does not exist, the sixth wiring capable of being affected by voltage noise; and disposing a dummy pattern between the third wiring and the sixth wiring.

13. The method of disposing a dummy pattern according to claim 12, wherein the fifth wiring which is judged to be capable of being affected by voltage noise is a VDD wiring or a GND wiring.

14. The method of disposing a dummy pattern according to claim 11, further comprising the step of: judging whether or not the fifth wiring is a wiring that is capable of being affected by voltage noise, when it is judged the fifth wiring does exist.

15. The method of disposing a dummy pattern according to claim 14, further comprising: disposing a dummy pattern between the third wiring and the fifth wiring, when it is judged that the fifth wiring is capable of being affected by voltage noise.

16. The method of disposing a dummy pattern according to claim 15, wherein the fifth wiring which is judged to be capable of being affected by voltage noise is a VDD wiring or a GND wiring.

17. The method of disposing a dummy pattern according to claim 15, wherein the dummy pattern is not disposed between the third wiring and the fifth wiring, when it is judged that the fifth wiring is a wiring which is not capable of being affected by voltage noise.

18. The method of disposing a dummy pattern according claim 17, wherein the fifth wiring which is judged to be a wiring which is not capable of being affected by voltage noise is a signal wiring.

19. A method of disposing a dummy pattern used for a semiconductor integrated circuit having a multilevel wiring structure, the method comprising the steps of:

obtaining a first inter-wiring parasitic capacitance and a first wiring total parasitic capacitance for each wiring using wiring layout data of the semiconductor integrated circuit and initial dummy pattern layout data;

creating a first inter-wiring parasitic capacitance data base based on the first inter-wiring parasitic capacitance;

creating a first wiring total parasitic capacitance data base based on the first wiring total parasitic capacitance;

performing a first dynamic simulation for identifying a first wiring affected by voltage noise, by using the first inter-wiring parasitic capacitance data base and a first wiring total parasitic capacitance data base;

performing a first static simulation for identifying a second wiring affected by voltage noise, by using the first inter-wiring parasitic capacitance data base and the first wiring total parasitic capacitance data base;

creating a first wiring information data base storing the results of the first dynamic simulation and the first static simulation, the results of the first dynamic simulation being information about the first wiring, and the results of the first static simulation being information about the second wiring;

performing an additional insertion of a dummy pattern near a third wiring in the initial dummy pattern, the third wiring being determined to be a wiring which may be affected by voltage noise based on the data in the first wiring information data base;

creating modified dummy pattern layout data by deleting or reducing the initial dummy pattern adjoining the third wiring, the initial dummy pattern being contained in the initial dummy pattern layout data;

obtaining a second inter-wiring parasitic capacitance and a second wiring total parasitic capacitance for each wiring, by means of using the wiring layout data and the modified dummy pattern layout data;

creating a second inter-wiring parasitic capacitance data base based on the second inter-wiring parasitic capacitance;

creating a second wiring total parasitic capacitance data base based on the second wiring total parasitic capacitance;

performing a second dynamic simulation for confirming the influence of voltage noise with respect to the third wiring, by means of using the data in the second inter-wiring parasitic capacitance data base and the second wiring total parasitic capacitance data base;

performing a second static simulation for confirming the influence of voltage noise with respect to the third wiring, by means of using the data in the second inter-wiring parasitic capacitance data base and the second wiring total parasitic capacitance data base;

creating a second wiring information data base storing the results of the second dynamic simulation and the second static simulation;

judging whether the influence of voltage noise on the third wiring is canceled or not by means of using the second wiring information;

judging whether the influence of voltage noise with respect to the third wiring is reduced or not by comparing the amounts of voltage noises between the first wiring information data base and the second wiring information data base; and analyzing the capacitance of the first and second wirings based on the first wiring information data base; and determining the third wiring based on the results of the analysis on the capacitance of the first and second wirings, wherein the judgment as to whether the influence of voltage noise with respect to the third wiring is reduced or not is performed when the influence of voltage noise is not canceled, wherein the additional insertion of a dummy pattern is performed when the influence of voltage noise is reduced, and is performed after the deleted or reduced initial dummy pattern is restored to the initial dummy pattern when the influence of voltage noise is not reduced, and wherein the method further comprises fabricating the semiconductor integrated circuit, the fabricating step including a step of making an exposure using a mask having a mask pattern corresponding to at least one of the initial dummy pattern, the additionally inserted dummy pattern, and the modified dummy pattern.

20. The method of disposing a dummy pattern according to claim 19, further comprising the step of: judging whether or not a fifth wiring that adjoins the third wiring exists on at least one of a same layer as the third wiring, above the third wiring, and below the third wiring.

21. The method of disposing a dummy pattern according to claim 20, further comprising the steps of: disposing a sixth wiring adjoining the third wiring on at least one of the same layers as the third wiring, above the third wiring, and below the third wiring when the fifth wiring does not exist, the sixth wiring capable of being affected by voltage noise; and disposing a dummy pattern between the third wiring and the sixth wiring.

22. The method of disposing a dummy pattern according to claim 21, wherein the fifth wiring which is judged to be capable of being affected by voltage noise is a VDD wiring or a GND wiring.

23. The method of disposing a dummy pattern according to claim 20, further comprising the step of: judging whether or not the fifth wiring is a wiring that is capable of being affected by voltage noise, when it is judged that the fifth wiring does exist.

24. The method of disposing a dummy pattern according to claim 23, further comprising: disposing a dummy pattern between the third wiring and the fifth wiring, when it is judged that the fifth wiring is a wiring which is capable of being affected by voltage noise.

25. The method of disposing a dummy pattern according to claim 24, wherein the fifth wiring which is judged to be capable of being affected by voltage noise is a VDD wiring or a GND wiring.

26. The method of disposing a dummy pattern according to claim 23, wherein the dummy pattern is not be disposed between the third wiring and the fifth wiring, when it is judged that the fifth wiring is a wiring which is not capable of being affected by voltage noise.

27. The method of disposing a dummy pattern according claim 26, wherein the fifth wiring which is judged to be wiring which is not be affected by voltage noise is a signal wiring.

28. The method of disposing a dummy pattern according to claim 19, wherein the third wiring adjoins a fourth wiring which imparts voltage noise to the third wiring, the fourth wiring existing on at least one of the upper portion of the third wiring, the lower portion of the third wiring, and the same layer as the third wiring.

29. The method of disposing a dummy pattern according to claim 28, further comprising the step of: judging whether or not a fifth wiring that adjoins the third wiring exists on at least one of the same layer as the third wiring, the upper portion of the third wiring, and the lower portion of the third wiring.

30. The method of disposing a dummy pattern according to claim 29, further comprising the steps of: disposing a sixth wiring adjoining the third wiring on at least one of a same layer as the third wiring, above the third wiring, and below the third wiring when the fifth wiring does not exist, the sixth wiring capable of being affected by voltage noise; and disposing a dummy pattern between the third wiring and the sixth wiring.

31. The method of disposing a dummy pattern according to claim 30, wherein the fifth wiring which is judged to be capable of being affected by voltage noise is a VDD wiring or a GND wiring.

32. The method of disposing a dummy pattern according to claim 30, wherein the fifth wiring which is judged to be capable of being affected by voltage noise is a VDD wiring or a GND wiring.

33. The method of disposing a dummy pattern according to claim 29, further comprising the step of: judging whether or not the fifth wiring is a wiring that is capable of being affected by voltage noise, when it is judged that the fifth wiring does exist.

34. The method of disposing a dummy pattern according to claim 33, further comprising: disposing a dummy pattern between the third wiring and the fifth wiring, when it is judged that the fifth wiring is a wiring which is capable of being affected by voltage noise.

35. The method of disposing a dummy pattern according to claim 33, wherein the dummy pattern is be disposed between the third wiring and the fifth wiring, when it is judged that the fifth wiring is a wiring which is not capable of being affected by voltage noise.

36. The method of disposing a dummy pattern according claim 35, wherein the fifth wiring which is judged to be a wiring which is not capable of being affected by voltage noise is a signal wiring.

* * * * *